(12) United States Patent
Watanabe et al.

(10) Patent No.: US 11,829,885 B2
(45) Date of Patent: Nov. 28, 2023

(54) IMAGE PROCESSING APPARATUS THAT PERFORMS MACHINE LEARNING OF LEARNING MODEL, METHOD OF CONTROLLING IMAGE PROCESSING APPARATUS, AND STORAGE MEDIUM

(71) Applicant: CANON KABUSHIKI KAISHA, Tokyo (JP)

(72) Inventors: Kento Watanabe, Kanagawa (JP); Takayuki Kimura, Kanagawa (JP); Taro Takita, Kanagawa (JP); Shunsuke Miyajima, Kanagawa (JP); Daisuke Higuchi, Osaka (JP); Hiroyuki Hasegawa, Chiba (JP); Shunsuke Kawahara, Tokyo (JP); Masatoshi Otsubo, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 302 days.

(21) Appl. No.: 17/344,036

(22) Filed: Jun. 10, 2021

(65) Prior Publication Data

US 2021/0397899 A1    Dec. 23, 2021

(30) Foreign Application Priority Data

Jun. 17, 2020  (JP) ............................... 2020-104815
Jul. 2, 2020   (JP) ............................... 2020-114908
(Continued)

(51) Int. Cl.
    *G06N 3/08*    (2023.01)
    *G06N 3/084*   (2023.01)
(Continued)

(52) U.S. Cl.
    CPC ............ *G06N 3/084* (2013.01); *G06F 18/214* (2023.01); *G06F 18/217* (2023.01); *G06N 3/04* (2013.01);
(Continued)

(58) Field of Classification Search
    CPC ............ G06N 3/084; G06N 3/04; G06N 3/08; G06N 3/045; G06N 3/044; G06N 3/047;
(Continued)

(56) References Cited

U.S. PATENT DOCUMENTS 9,373,160 B2 *  6/2016 Fergus ................... G06T 5/005
11,048,988 B2 *  6/2021 Matsuzawa ........ H04N 1/00045
(Continued)

FOREIGN PATENT DOCUMENTS

JP       2019-121252 A    7/2019

OTHER PUBLICATIONS

Chen et al. "Learning to See in the Dark"—10 Pages, Submitted May 4, 2018 https://arxiv.org/abs/1805.01934 Cited in Specification [0003].

*Primary Examiner* — Juan A Torres
(74) *Attorney, Agent, or Firm* — Cowan, Liebowitz & Latman, P.C.

(57) ABSTRACT

An information processing apparatus that performs machine learning of a learning model for improving the accuracy of inference of an image even in a case where the characteristics of an image are changed by correction applied to the image. The image processing apparatus includes an image processor configured to perform image processing on a training image and a teacher image according to each of a plurality of correction conditions. Machine learning of the learning model is performed using the training image and the teacher image. A plurality of parameters obtained by performing the machine learning of the learning model are
(Continued)

stored in association with the plurality of correction conditions, respectively.

26 Claims, 30 Drawing Sheets

(30) Foreign Application Priority Data

| | | |
|---|---|---|
| Jul. 9, 2020 | (JP) | 2020-118595 |
| Jul. 17, 2020 | (JP) | 2020-123002 |
| Apr. 2, 2021 | (JP) | 2021-063580 |

(51) Int. Cl.
| | |
|---|---|
| *G06N 3/04* | (2023.01) |
| *G06F 18/21* | (2023.01) |
| *G06F 18/214* | (2023.01) |
| *G06V 10/764* | (2022.01) |
| *G06V 10/774* | (2022.01) |
| *G06V 10/776* | (2022.01) |

(52) U.S. Cl.
CPC ............. *G06N 3/08* (2013.01); *G06V 10/764* (2022.01); *G06V 10/774* (2022.01); *G06V 10/776* (2022.01)

(58) Field of Classification Search
CPC ..... G06N 3/048; G06F 18/214; G06F 18/217; G06V 10/764; G06V 10/774; G06V 10/776
USPC .......................................................... 382/157
See application file for complete search history.

(56) References Cited

U.S. PATENT DOCUMENTS

| | | | |
|---|---|---|---|
| 2005/0100208 A1* | 5/2005 | Suzuki | G06T 5/30 |
| | | | 382/128 |
| 2019/0213719 A1* | 7/2019 | Hiasa | H04N 1/6058 |
| 2020/0005135 A1* | 1/2020 | Che | G06N 3/084 |
| 2020/0097742 A1* | 3/2020 | Ratnesh Kumar | G06V 20/52 |
| 2020/0226421 A1* | 7/2020 | Almazan | G06N 3/045 |

* cited by examiner

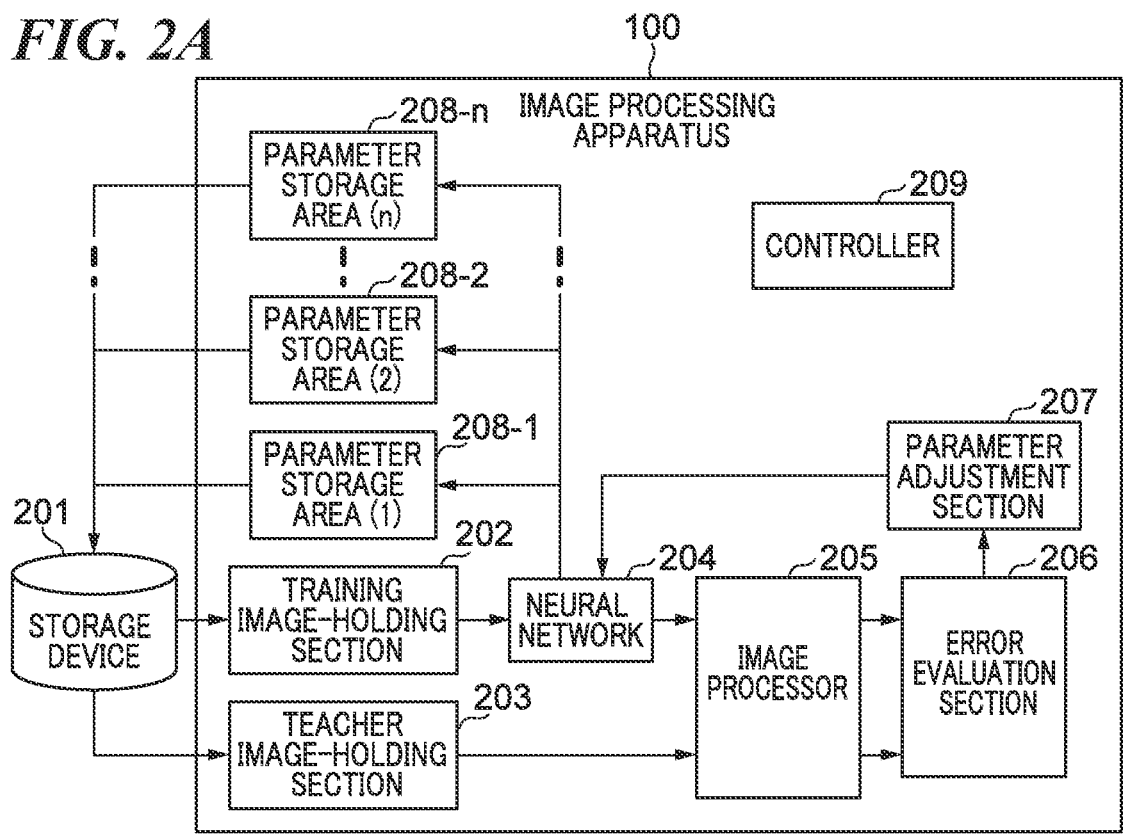
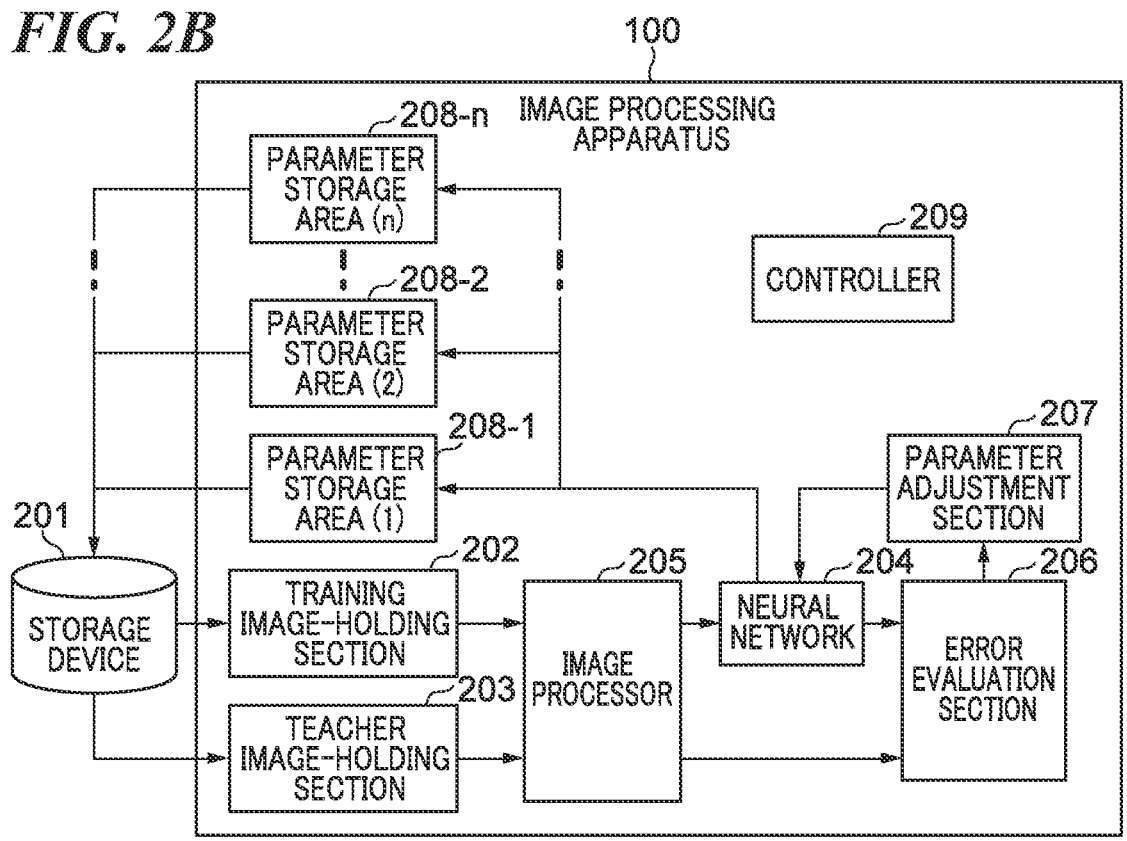

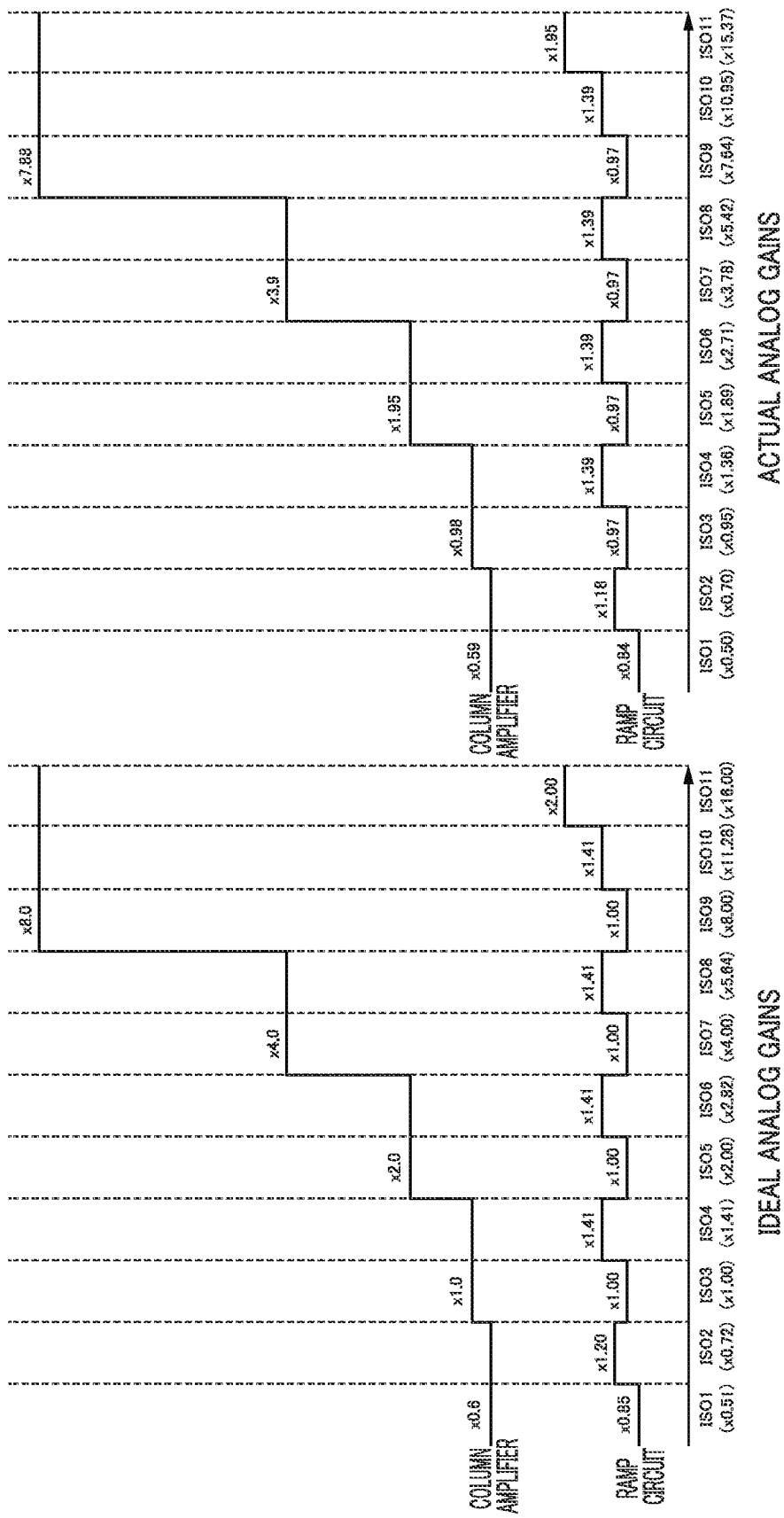

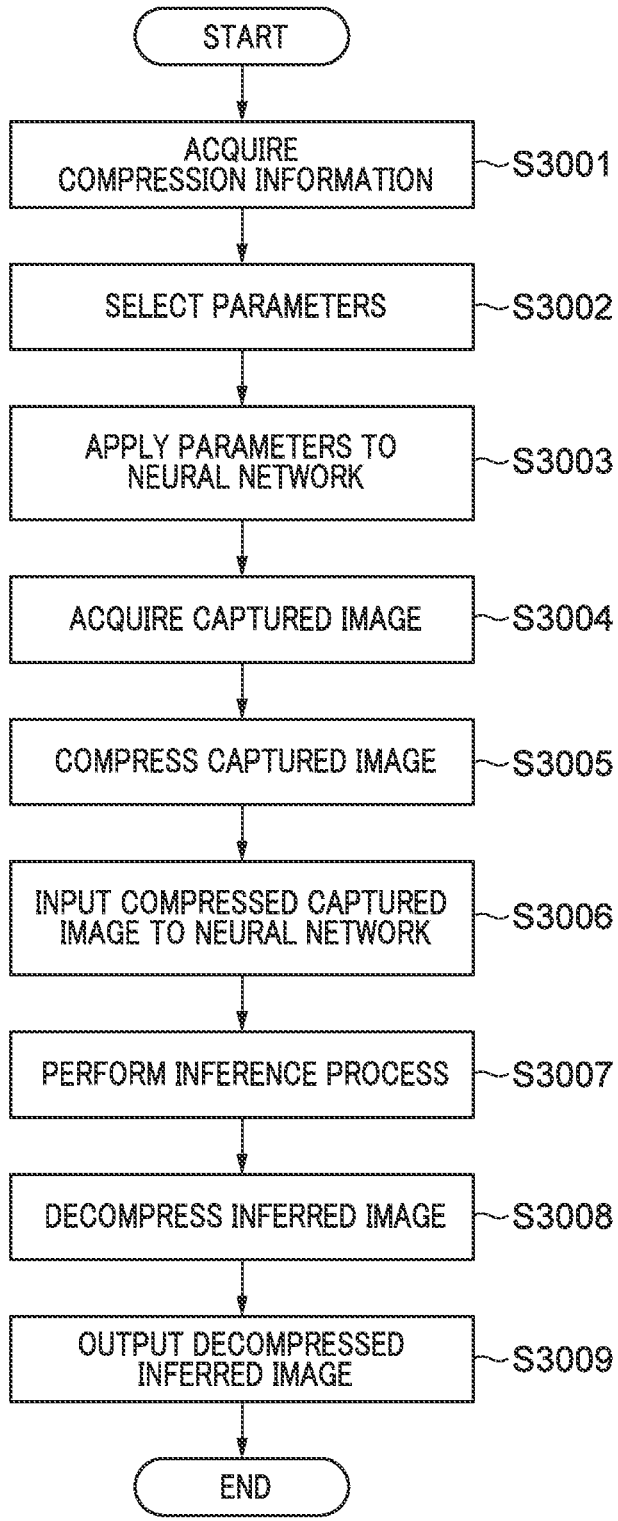

IMAGE PROCESSING APPARATUS THAT PERFORMS MACHINE LEARNING OF LEARNING MODEL, METHOD OF CONTROLLING IMAGE PROCESSING APPARATUS, AND STORAGE MEDIUM

CROSS-REFERENCE TO RELATED APPLICATIONS

This application claims the benefit of Japanese Patent Application No. 2020-104815 filed Jun. 17, 2020, Japanese Patent Application No. 2020-114908 filed Jul. 2, 2020, Japanese Patent Application No. 2020-118595 filed Jul. 9, 2020, Japanese Patent Application No. 2020-123002 filed Jul. 17, 2020, and Japanese Patent Application No. 2021-063580 filed Apr. 2, 2021, which are hereby incorporated by reference herein in their entirety.

BACKGROUND OF THE INVENTION

Field of the Invention

The present invention relates to an image processing apparatus that performs machine learning of a learning model, a method of controlling the image processing apparatus, and a storage medium.

Description of the Related Art

In recent years, there has been used a method of inferring an image which is improved e.g. in resolution and contrast by using a neural network. As related art, there has been proposed a technique in Japanese Laid-Open Patent Publication (Kokai) No. 2019-121252. In the technique disclosed in Japanese Laid-Open Patent Publication (Kokai) No. 2019-121252, an error between a correct answer image and an output image, which have been gamma-corrected, respectively, is calculated, and parameters of a neural network are updated based on the calculated error.

In the above-described technique disclosed in Japanese Laid-Open Patent Publication (Kokai) No. 2019-121252, one kind of parameters of the neural network are used to perform inference for correcting blur caused due to aberration or diffraction. Further, a technique disclosed in C. Chen, Q. Chen. J. Xu, and V. Koltun, "Learning to see in the dark", https://arxiv.org/abs/1805.01934, assumes that inference e.g. for removing noise is performed using one kind of network parameters. Therefore, in a case where image processing which changes characteristics of an image depending on a correction condition is employed, if a correction condition at the time of learning and a correction condition at the time of inference are different from each other, it is impossible to perform proper inference e.g. for noise removal.

SUMMARY OF THE INVENTION

The present invention provides an information processing apparatus that performs machine learning of a learning model for improving the accuracy of inference of an image even in a case where the characteristics of an image are changed by correction applied to the image.

In a first aspect of the present invention, there is provided an image processing apparatus comprising at least one processor, and a memory coupled to the at least one processor, the memory having instructions that, when executed by the processor, perform the operations as: an image processing unit configured to perform image processing on a training image and a teacher image according to each of a plurality of correction conditions, a learning unit configured to perform machine learning of a learning model using the training image and the teacher image, and a control unit configured to perform control for storing a plurality of parameters obtained by performing the machine learning of the learning model, in association with the plurality of correction conditions, respectively.

In a second aspect of the present invention, there is provided an image processing apparatus comprising at least one processor, and a memory coupled to the at least one processor, the memory having instructions that, when executed by the processor, perform the operations as: a storage unit configured to store a plurality of parameters of a learning model, which have been obtained while performing image processing according to a plurality of correction conditions, in different areas, respectively, a selection unit configured to select a parameter from the plurality of stored parameters according to information on any of the plurality of correction conditions, and an inference unit configured to perform an inference process on an image by applying the selected parameter to the learning model.

In a third aspect of the present invention, there is provided a method of controlling an image processing apparatus, comprising performing image processing on a training image and a teacher image according to each of a plurality of correction conditions, performing machine learning of the learning model using the training image and the teacher image, and storing a plurality of parameters obtained by performing the machine learning of the learning model, in association with the plurality of correction conditions, respectively.

In a fourth aspect of the present invention, there is provided a method of controlling an image processing apparatus, comprising storing a plurality of parameters of a learning model, which have been obtained while performing image processing according to a plurality of correction conditions, in different areas, respectively, selecting a parameter from the plurality of stored parameters according to information on any of the plurality of correction conditions, and performing an inference process on an image by applying the selected parameter to the learning model.

In a fifth aspect of the present invention, there is provided a method of controlling an image processing apparatus, comprising acquiring a training image and a teacher image, inputting the training image to a neural network to generate an output image, executing image processing on each of the teacher image and the output image, calculating an error between the teacher image and the output image on which the image processing has been executed, updating network parameters of the neural network based on the error, and storing a plurality of the network parameters in association with each of characteristics of the image processing.

According to the present invention, it is possible to improve the inference accuracy even in a case where the characteristics of an image are changed by correction applied to the image.

Further features of the present invention will become apparent from the following description of exemplary embodiments (with reference to the attached drawings).

BRIEF DESCRIPTION OF THE DRAWINGS

FIGS. 2A and 2B are functional block diagrams of the image processing apparatus each useful in explaining a learning process.

FIGS. 8A and 8B are diagrams showing a first example of analog gains.

FIG. 30 is a flowchart of a flow of the inference process in the sixth embodiment.

DESCRIPTION OF THE EMBODIMENTS

The present invention will now be described in detail below with reference to the accompanying drawings showing embodiments thereof. However, configurations described in the following embodiments are described by way of example, and are by no means intended to limit the scope of the present invention to the described configurations.

Figure 1:
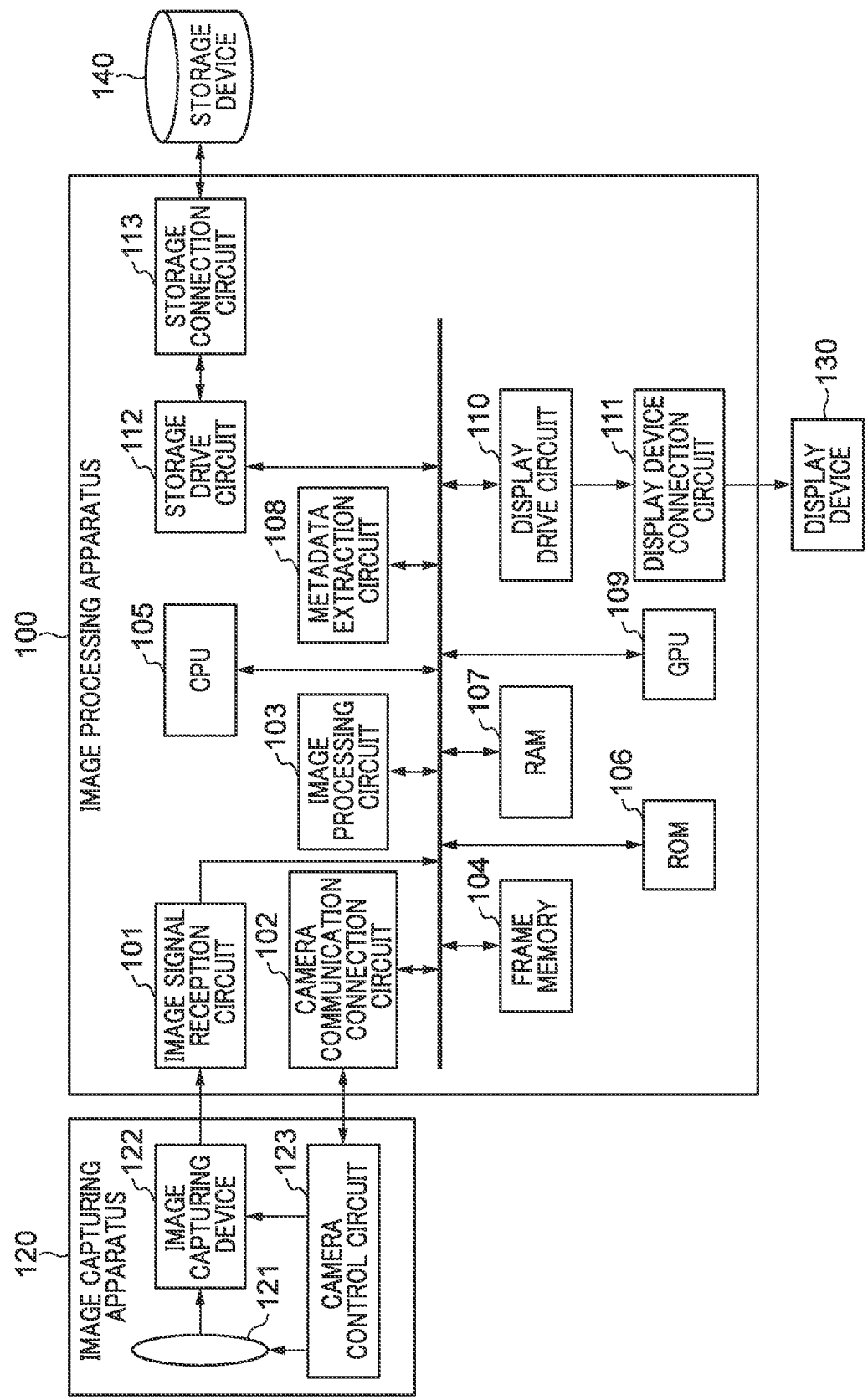
FIG. 1 is a diagram showing an example of a system configuration including an image processing apparatus.

A configuration which is common to the embodiments will be described below. FIG. 1 is a diagram showing an example of a system configuration including an image processing apparatus. In the system configuration shown in FIG. 1, the image processing apparatus, denoted by reference numeral 100, is connected to an image capturing apparatus 120, a display device 130, and a storage device 140. The system configuration is not limited to the illustrated example in FIG. 1. For example, the image processing apparatus 100 may be configured to include one or both of the display device 130 and the storage device 140. Further, the image processing apparatus 100 may be incorporated in the image capturing apparatus 120. The image processing apparatus 100 may be an edge computer, a local server, a cloud server, or the like.

The image processing apparatus 100 performs various image processing operations and further performs a learning process and an inference process. Hereafter, the learning process is assumed to be a process using deep learning. However, the image processing apparatus 100 may perform machine learning using a machine learning method other than deep learning. For example, the image processing apparatus 100 may perform the learning process using a desired machine learning method, such as a support vector machine method, a decision tree method, or a logistic regression method.

In the learning process, a learning set formed by a pair of a training image and a teacher image is input to a neural network, and network parameters (hereinafter referred to as the parameters) of the neural network, such as weights and biases, are adjusted. A lot of learning sets are input to the neural network and machine learning is performed, whereby the parameters are optimized so as to make the feature distribution of an image output from the neural network close to the feature distribution of the teacher image. When an unknown image is input to the neural network to which the learned parameters are set, an inference result (inferred image) is output from the neural network.

The image capturing apparatus 120 will be described. The image capturing apparatus 120 includes a lens unit 121, an image capturing device 122, and a camera control circuit 123. The image capturing apparatus 120 may include other elements. The lens unit 121 is comprised of a diaphragm, an optical lens, a motor, and so forth. The motor drives the diaphragm and the optical lens. The lens unit 121 may be configured to include a plurality of optical lenses. The lens unit 121 is operated based on a control signal delivered from the camera control circuit 123 and is capable of optically enlarging/reducing a video image, adjusting a focal length, etc. The opening area of the diaphragm of the lens unit 121 can be controlled. This makes it possible to control an aperture value (F-number) to adjust an incident light amount.

Light transmitted through the lens unit 121 forms an image on the image capturing device 122. The image capturing device 122, such as a CCD or a CMOS sensor, converts incident light to electrical signals. The image capturing device 122 is driven based on a control signal delivered from the camera control circuit 123. The image capturing device 122 has functions of performing reset of electric charges in respective pixels, control of readout timing, gain processing performed on read signals, conversion of signals from analog to digital, and so forth. The image capturing apparatus 120 transmits digital image signals output from the image capturing device 122 to an image signal reception circuit 101 of the image processing apparatus 100. In the illustrated example in FIG. 1, the image capturing apparatus 120 and the image processing apparatus 100 are communicably connected to each other by wired or wireless connection, and the image processing apparatus 100 receives image signals transmitted from the image capturing apparatus 120. The camera control circuit 123 controls driving of the lens unit 121 and the image capturing device 122 based on drive control signals received from a camera communication connection circuit 102 of the image processing apparatus 100.

Next, the image processing apparatus 100 will be described. The image signal reception circuit 101 receives image signals from the image capturing apparatus 120. The camera communication connection circuit 102 transmits the drive control signals for driving the lens unit 121 and the image capturing device 122 to the image capturing apparatus 120. An image processing circuit 103 performs image processing on the image signals received by the image signal reception circuit 101. This image processing may be performed by a CPU 105. Further, the image processing circuit 103 has a function of performing noise reduction processing using a neural network. The image processing circuit 103 may be implemented by a circuit for performing image processing, such as a microprocessor, a DSP, a FPGA, or an ASIC, or may be implemented by the CPU 105.

A frame memory 104 is a memory for temporarily storing image signals. The frame memory 104 is an element that is capable of temporarily storing image signals and reading out the stored image signals at high speed. Assuming that the amount of data of image signals is large, it is preferable to use a high-speed and large-capacity memory as the frame memory 104. For example, as the frame memory 104, a DDR3-SDRAM (Dual Data Rate 3-Synchronous Dynamic RAM), and so forth, can be used. In a case where the DDR3-SDRAM is used as the frame memory 104, various processing operations are made possible. For example, the DDR3-SDRAM is an element that is suitable for performing image processing, such as synthesis of images which are temporally different and cutout of a necessary area. However, the frame memory 104 is not limited to the DDR3-SDRAM.

The CPU 105 reads out control programs and various parameters, which are stored in a ROM 106, and loads them into a RAM 107. The CPU 105 executes the programs loaded into the RAM 107, whereby processes in the embodiments are realized. A metadata extraction circuit 108 extracts metadata, such as a lens driving condition and a sensor driving condition. A GPU 109 is a graphic processing unit which is a processor capable of performing high-speed calculation processing. The GPU 109 is used for generating a screen to be displayed on the display device 130 and is also suitably used for calculation processing of deep learning. An image generated by the GPU 109 is output to the display device 130 via a display drive circuit 110 and a display device connection circuit 111. With this, the image is displayed on the display device 130.

A storage drive circuit 112 drives the storage device 140 via a storage connection circuit 113. The storage device 140 stores a lot of image data. The image data stored in the storage device 140 include a training image (image for learning) and a teacher image (correct answer image) associated with the training image. The training image and the teacher image form one pair (learning set). The storage device 140 stores a plurality of learning sets. The storage device 140 may store learned parameters generated by the learning process. Hereafter, the description is given assuming that when performing the learning process by the control of the CPU 105, image data stored in the storage device 140 in advance is used, and when performing the inference process, image signals acquired from the image capturing apparatus 120 are used. However, this is not limitative. For example, w % ben performing the inference process, image signals stored in the storage device 140, an external storage device, or the like, may be used.

The training image used in the learning process may be an image of the Bayer array, an image captured by a three-plate type image capturing sensor, or an image captured e.g. by a vertical color separation type image capturing sensor. Further, the training image may be an image of an array other than the Bayer array (such as an image of the honeycomb structure, an image of the color filter array having a low periodicity, or the like). Further, in a case where the training image is an image of the Bayer array, the training image may be a one-channel image of the Bayer array, or an image separated for each color channel. The above is also the same with the teacher image. The training image and the teacher image are not limited to the above-described example.

Next, the learning process will be described. FIGS. 2A and 2B are functional block diagrams of the image processing apparatus 100 each useful in explaining the learning process. First, the functions of the image processing apparatus 100 will be described with reference to FIG. 2A. A training image-holding section 202 holds a training image acquired from a storage device 201. A teacher image-holding section 203 holds a teacher image acquired from the storage device 201. The training image-holding section 202 and the teacher image-holding section 203 may be implemented e.g. by the RAM 107.

The teacher image and the training image are images in which the same object appears. The training image is an image containing noise, and the teacher image is a correct answer image without noise. However, the teacher image may include some noise. For example, the training image may be generated by the CPU 105 or the image processing circuit 103 adding noise to the teacher image. Further, the training image may be an image generated by capturing the same object as the correct answer image in a situation in which noise can be generated (such as an image captured with high sensitivity setting). The training image may be an image generated by correcting the sensitivity of an image captured under low illuminance to the same level as the teacher image. Further, the teacher image may be an image captured with low sensitivity (sensitivity lower than that of the training image).

A neural network 204 is a neural network having a multi-layer structure. Details of the neural network 204 will be described hereinafter. When learning (deep learning) is performed on the neural network 204, to improve the inference accuracy, it is preferable to use training images including various noise patterns and objects. By performing the learning of the neural network 204 using training images including various noise patterns and objects, the accuracy of the inference process performed when inputting an unknown image including a noise pattern or an object, which is not included in the training images, is improved. In a case where the number of training images used for deep learning of the neural network 204 is insufficient, for example, image augmentation, such as cutout, rotation, and inversion, may be performed on the training images. In this case, the same image augmentation is also performed on the teacher images. Further, it is preferable that the training image and the teacher image are normalized by dividing them by an upper limit value (saturated luminance value) of the signal, respectively. When a training image is input, the neural network 204 generates an output image and outputs the generated output image.

An image processor 205 performs image processing on an output image from the neural network 204 and a teacher image. Examples of the image processing include ISO sensitivity correction. F-number correction, color suppression processing, color curving correction, color balance correction, peripheral light falloff correction, inter-channel gain correction, flicker correction, and compression/decompression processing. When the learning process of the neural network 204 is completed, learned parameters are generated. With this, it is possible to perform the inference process by applying the learned parameters to the neural network 204. It is preferable that the image processor 205 causes conditions of correction performed in the learning process and conditions of correction performed in the inference process to match each other. This improves the inference accuracy obtained when the inference process is performed. In FIG. 2A, the image processor 205 is arranged on the output side of the neural network 204, but as shown in FIG. 2B, the image processor 205 may be arranged on the input side of the neural network 204. The image processor 205 is implemented by the image processing circuit 103, the CPU 105, or the like An error evaluation section 206 calculates an error between an output image and a teacher image which are corrected by the image processor 205. The teacher image and the training image have the same arrangement of the color component array. The error evaluation section 206 may calculate an error (loss error) by using e.g. a mean square error for each pixel or a sum of absolute values of differences between pixels. Further, the error evaluation section 206 may evaluate an error by calculating the error using another index, such as a decision coefficient. A parameter adjustment section 207 updates the parameters of the neural network 204 such that the error calculated by the error evaluation section 206 is reduced. The error evaluation section 206 and the parameter adjustment section 207 may be implemented e.g. by the CPU 105 or the GPU 109, or may be implemented by cooperation of the CPU 105 and the GPU 109. The error evaluation section 206 and the parameter adjustment section 207 correspond to a learning unit.

The parameter adjustment section 207 may update the parameters of the neural network 204 e.g. by back propagation. The parameter adjustment section 207 may update the parameters of the neural network 204 by another method. In doing this, the parameter adjustment section 207 may fix or vary an updated amount of each parameter of the neural network 204. Thus, the parameters of the neural network 204 are updated such that an error between the output image and the teacher image, on which image processing has been performed by the image processor 205, is reduced. This improves the inference accuracy obtained when an unknown image is input to the neural network 204.

Parameter storage areas 208-1 to 208-$n$ (n is an integer not smaller than 2) are areas for storing updated parameters. The parameter storage areas 208-1 to 208-$n$ (hereinafter collectively referred to as the parameter storage areas 208) are areas for storing the parameters of the neural network 204, which are obtained by the learning process performed according to correction conditions of image processing. That is, each parameter storage area 208 stores learned parameters obtained by the learning process performed with a different correction condition of image processing, such that the learned parameters are associated with the different correction condition of image processing. The parameter storage areas 208 may be part of the storage areas in the RAM 107 or may be part of the storage areas in the storage device 201. The controller 209 performs various controls on the learning process. The controller 209 is implemented by the CPU 105.

Figure 3:
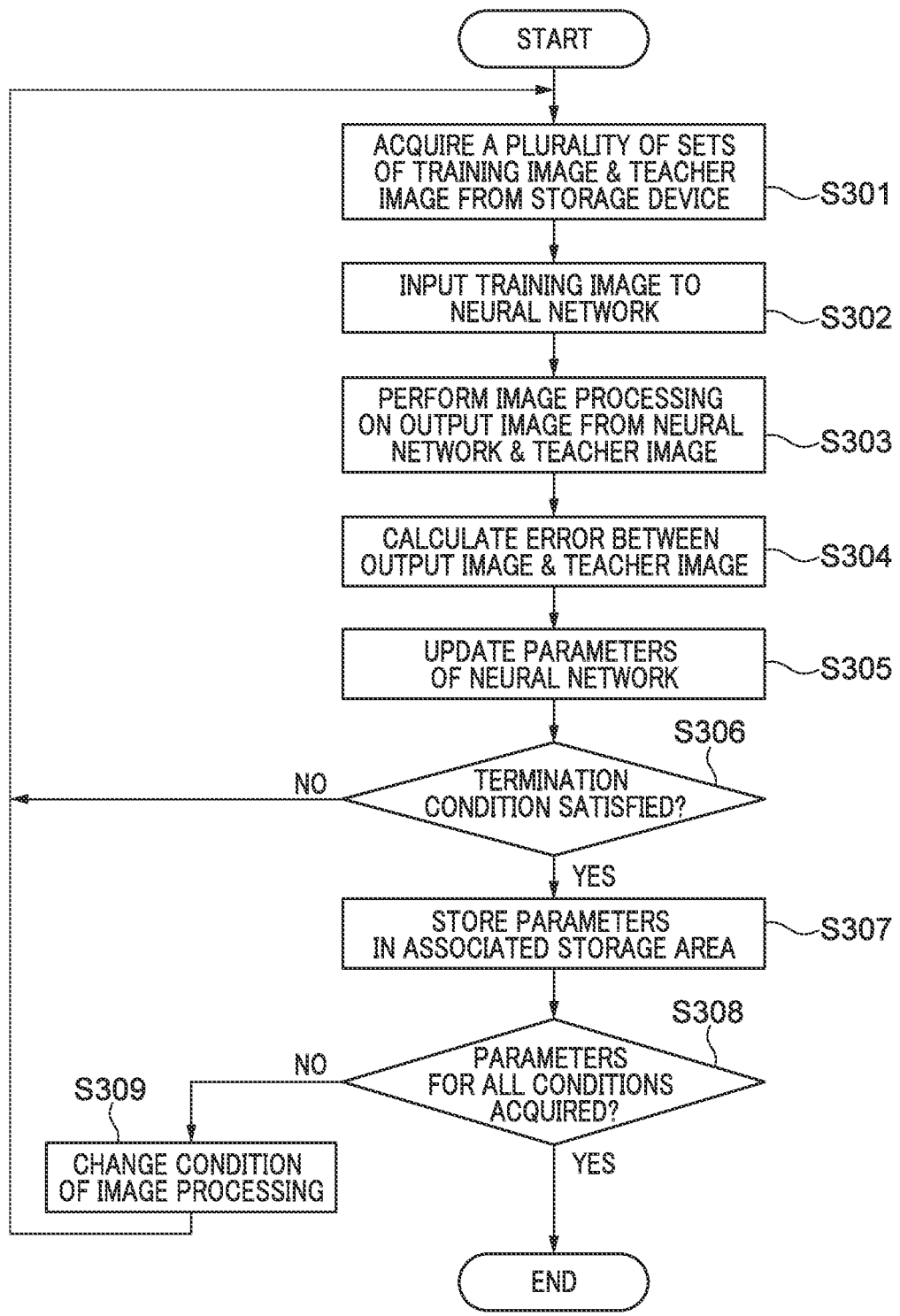
FIG. 3 is a flowchart of a flow of the learning process of embodiments.

Next, a flow of the learning process will be described. FIG. 3 is a flowchart of the flow of the learning process. In FIG. 3, numerals each with a prefix S represent step numbers, and the same applies to other flowcharts. In a step S301, the controller 209 acquires pairs of training images and teacher images (learning sets) from the storage device 201. In a step S302, the controller 209 inputs a training image of one of the plurality of acquired learning sets to the neural network 204. An output image is generated by the process performed by the neural network 204. A noise amount and a noise pattern of the training image are sometimes different from a noise amount and a noise pattern of the other training images or sometimes the same as those.

In a step S303, the image processor 205 performs image processing on the output image from the neural network 204 and the teacher image. As mentioned above, the image processor 205 may be arranged on the input side or the output side of the neural network 204. That is, the image processing in the step S303 may be performed on a pair of a training image and a teacher image of one of the plurality of learning sets acquired in the step S301, and then, the training image subjected to the image processing may be input to the neural network 204 for execution of the step S302.

In a step S304, the error evaluation section 206 calculates an error between the output image and the teacher image which have been subjected to the image processing. In a step S305, the parameter adjustment section 207 updates the parameters of the neural network 204 by back propagation such that the calculated error is reduced. In a step S306, the controller 209 determines whether or not a predetermined termination condition is satisfied. The controller 209 may determine that the predetermined termination condition is satisfied in a case where the number of times of execution of the learning process reaches a predetermined number of times. Further, the controller 209 may determine that the predetermined termination condition is satisfied in a case where the calculated error is equal to or smaller than a predetermined value. Alternatively, the controller 209 may determine that the predetermined termination condition is satisfied in a case where a degree of reduction of the above-mentioned error is equal to or lower than a predetermined degree, or in a case where a termination instruction is given by a user. If the answer to the question of the step S306 is negative (NO), the controller 209 returns to the step S301. In this case, the steps S301 to S305 are executed using a new learning set of a training image and a correct answer image. On the other hand, if the answer to the question of the step S306 is affirmative (YES), the controller 209 proceeds to a step S307.

In the step S307, the controller 209 stores the updated parameters (learned parameters) in the parameter storage area 208 associated with an applied correction condition of image processing. At this time, the controller 209 may store not only the parameters updated by the learning process, but also information concerning the model structure and the like of the neural network 204 in association with the parameters. In a step S308, the controller 209 determines whether or not the parameters have been acquired with respect to all of the correction conditions of image processing. If the answer to the question to the step S308 is affirmative (YES), the controller 209 terminates the process in FIG. 3. On the other hand, if the answer to the question to the step S308 is negative (NO), the controller 209 proceeds to a step S309. In the step S309, the controller 209 changes the correction condition of image processing. Then, the controller 209 returns to the step S301. With this, the learning process with the changed correction condition of image processing is newly performed.

Figure 4:
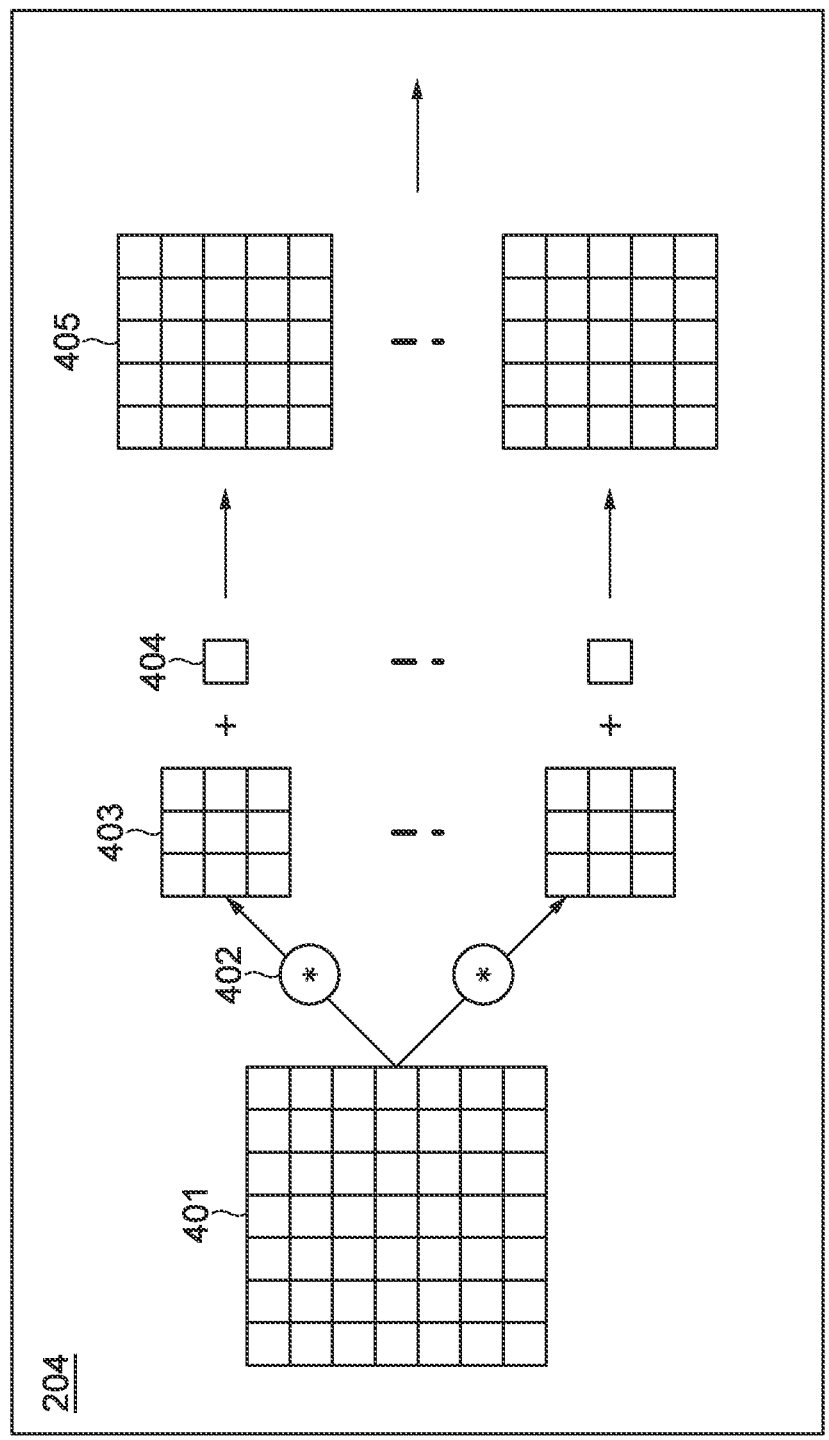
FIG. 4 is a diagram showing an example of a neural network.

Next, the neural network 204 as the learning model used in the present embodiment will be described. FIG. 4 is a diagram showing an example of the neural network 204. The description is given assuming that the neural network 204 of each embodiment is a convolutional neural network (CNN). However, the neural network 204 is not limited to the CNN. For example, the neural network 204 may be a GAN (Generative Adversarial Network), a skip connection, a RNN (Recurrent Neural Network), or the like Further, a learning model machine-learned by another machine learning method may be used in place of the neural network 204. As the learning model, for example, the above-mentioned support vector machine, a decision tree, or the like, can be applied.

When an input image 401 is input to the neural network 204, convolutional calculation 402 is performed. The input image 401 may be image data or data of a feature map of image data. A convolution matrix 403 is a filter for performing convolutional calculation on the input image 401. A bias 404 is added to an output result of convolutional calculation performed on the input image 401 using the convolution matrix 403. A feature map 405 is a calculation result of the convolutional calculation obtained by adding the bias 404. The number of intermediate layers, the number of neurons, a connection coefficient, a weight, and so forth of the neural network 204 may be set to desired values. Further, in a case where the neural network 204 is installed in a programming circuit, such as a FPGA, connections between neurons and weights may be reduced. This point also applies to a case where the GPU 109 performs the process of the neural network 204. Further, the learning process and the inference process may be collectively executed with respect to a plurality of color channels, or independently executed with respect to each of the plurality of colors.

In the CNN, convolutional calculation using a filter is executed on an input image to thereby extract a feature map of the input image. The size of the filter may be set to a desired size. In a subsequent layer, convolutional calculation using another filter is executed on the feature map extracted in a preceding layer, whereby different feature maps are sequentially extracted. In each of the intermediate layers, the input signal is multiplied by a weight of the filter indicative of connection strength and further a bias is added. By applying an activation function to this calculation result, an output signal in each neuron is obtained. The weight and the bias in each layer are parameters (network parameters), and the values of the parameters are updated by the learning process. The parameters updated by machine learning are learned parameters. As the activation function, a desired function, such as a sigmoid function and a ReLU function, can be applied. The description is given assuming that the activation function used in the embodiments is a Leaky ReLU function expressed by the following equation (1).

However, as the activation function, a desired activation function, such as a sigmoid function and a tan h function, may be applied.

$$f(x) = \max(x, x \times 0.2) \quad (1)$$

In the above equation (1), max represents a function that outputs a maximum value of arguments.

As mentioned hereinabove, the parameters (learned parameters) updated by the learning process are stored in the parameter storage areas 208-1 to 208-$n$ for each correction condition of image processing. When the inference process is performed, the parameters associated with a correction condition of image processing are acquired from one of the parameter storage areas 208-1 to 208-$n$. Then, the acquired parameters are applied to the neural network 204 to perform the the inference process. This makes it possible to improve the inference accuracy in a case where image processing with a different correction condition is performed.

In the above-described example, the learning process of the neural network 204 is performed using a training image containing noise and a teacher image which does not include noise or includes small noise. With this, when an unknown image containing noise is input to the neural network 204 subjected to machine learning, it is possible to infer an image reduced in noise, by the inference process performed by the neural network 204. Although in the above-described example, the learning process is performed for noise reduction, it can also be applied to a learning process for processing other than noise reduction. For example, in a case where super-resolution inference is performed by the neural network, it is possible to perform the learning process using a training image generated by down-sampling a teacher image and the teacher image. In doing this, the training image and the teacher image may be matched in size.

Figure 5:
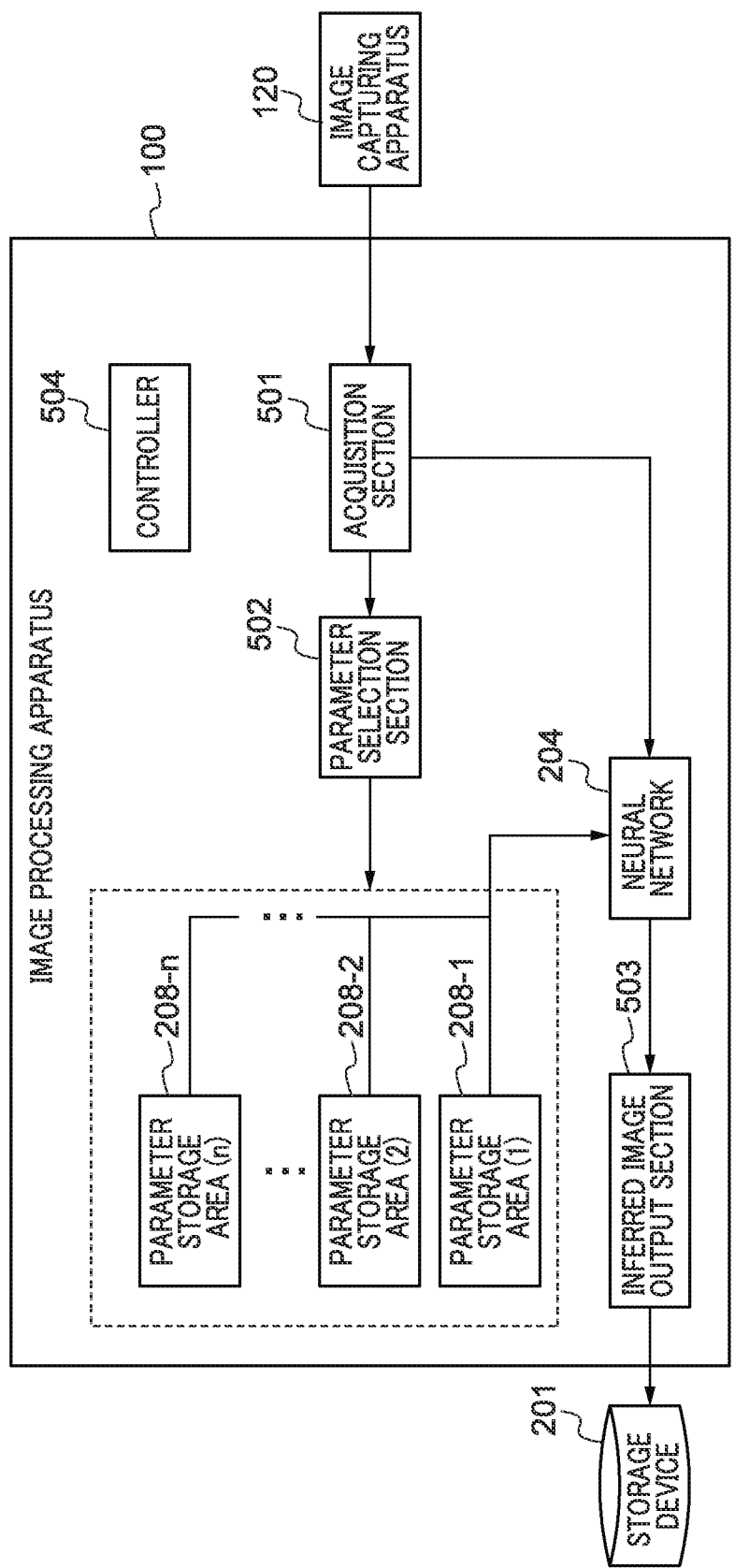
FIG. 5 is a functional block diagram of the image processing apparatus useful in explaining an inference process.

Next, the inference process will be described. FIG. 5 is a functional block diagram of the image processing apparatus 100 useful in explaining the inference process. An acquisition section 501 acquires a captured image and information used for selecting parameters, from the image capturing apparatus 120. The information used for selecting parameters is used to identify parameters to be selected out of the parameters stored in the parameter storage areas 208-1 to 208-$n$. The information used for selecting parameters may be metadata. The metadata may be information added to a captured image (information on settings of the lens unit 121, the image capturing apparatus 120, and so forth), or information extracted by the metadata extraction circuit 108. Here, the information used for selecting parameters is information concerning image processing. In a case where the information used for selecting parameters is the above-described metadata, the acquisition section 501 is not required to separately acquire the information used for selecting parameters.

A parameter selection section 502 as a selection unit acquires parameters associated with the acquired information used for selecting parameters, from one of the parameter storage areas 208-1 to 208-$n$. The parameters stored in the parameter storage areas 208-1 to 208-$n$ are parameters generated by the above-described learning process, but may be parameters subjected to the learning process performed by an external apparatus other than the image processing apparatus 100. In this case, the external apparatus performs the above-described learning process using a neural network having the same network structure as that of the neural network 204. Then, the image processing apparatus 100 may acquire the parameters generated by the learning process and store the acquired parameters in the parameter storage areas 208-1 to 208-$n$.

The learned parameters selected by the parameter selection section 502 are applied to the neural network 204. Then, the captured image acquired from the image capturing apparatus 120 is input to the neural network 204. When the captured image is input, the neural network 204 as an inference unit performs the inference process to generate an inferred image as an inference result. An inferred image output section 503 outputs the generated inferred image to the storage device 201. A controller 504 performs various controls on the inference process. The acquisition section 501, the parameter selection section 502, the inferred image output section 503, and the controller 504 are implemented e.g. by the CPU 105.

Figure 6:
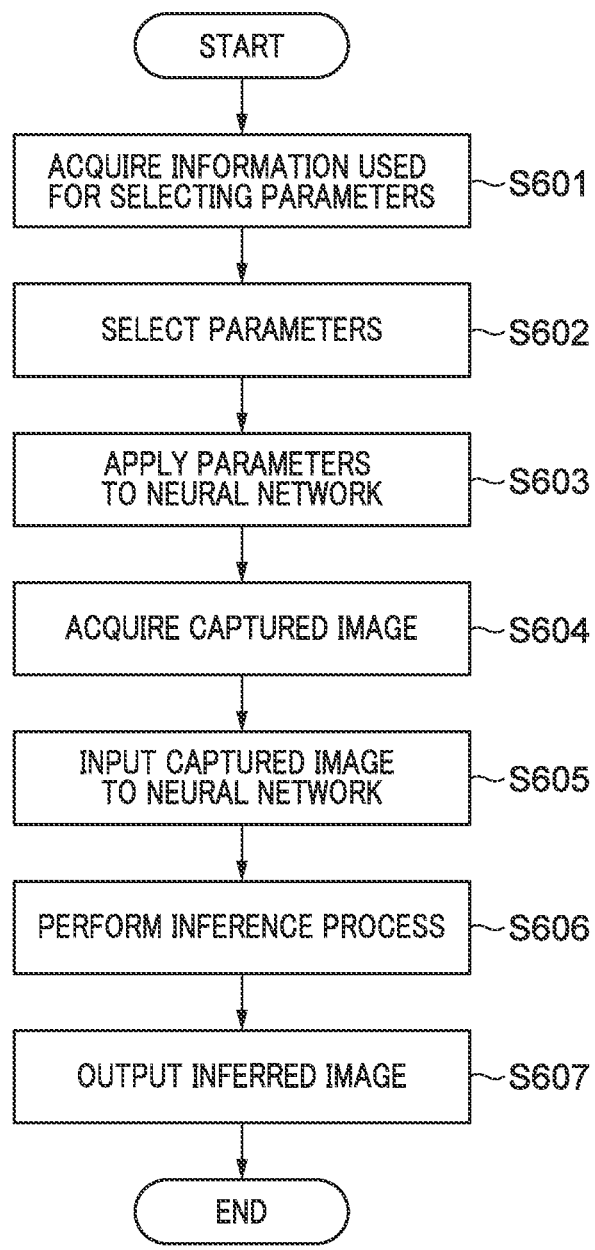
FIG. 6 is a flowchart of a flow of the inference process.

FIG. 6 is a flowchart of a flow of the inference process. In a step S601, the acquisition section 501 acquires information used for selecting parameters. In a step S602, the parameter selection section 502 selects parameters associated with the acquired information from the parameter storage areas 208-1 to 208-$n$. The parameters stored in each of the parameter storage areas 208-1 to 208-$n$ are parameters updated with a different correction condition of image processing. The acquired information used for selecting parameters is information concerning the correction condition of image processing. The parameter selection section 502 acquires parameters which were updated with a correction condition which is the same as or close to the correction condition of image processing which is indicated by the acquired information used for selecting parameters.

In a step S603, the controller 504 applies the selected parameters to the neural network 204. This makes it possible to properly perform the inference process using the neural network 204. In a step S604, the acquisition section 501 acquires a captured image from the image capturing apparatus 120. Note that the captured image acquired in the step S604 is a RAW image. In a case where the RAW image is encoded, the CPU 105 or the image processing circuit 103 performs decoding. The acquisition section 501 may acquire a RAW image e.g. from the storage device 140, the ROM 106, or the RAM 107.

In a step S605, the controller 504 inputs the acquired captured image to the neural network 204. In doing this, the controller 504 may convert the acquired captured image to an input image to be input to the neural network 204. The size of the captured image to be input to the neural network 204 when the inference process is performed may be the same as or different from the size of the training image input to the neural network 204 when the learning process has been performed. When converting the captured image to the input image, the controller 504 may perform standardization of signals, separation of color components, and/or the like.

In a step S606, the neural network 204 performs the inference process. The inference process performed by the neural network 204 may be executed by the GPU 109 or the CPU 105, or may be executed by a cooperative operation of the CPU 105 and the GPU 109. By performing the inference process in the step S606, an inferred image is generated as a result of the inference process performed by the neural network 204. In a step S607, the inferred image output section 503 outputs the generated inferred image to the storage device 140. The inferred image output section 503 may output the generated inferred image to the ROM 106, the RAM 107, the display section 130, or the like In a case where the captured image has been converted to the input image in the step S604, the controller 504 may perform reverse conversion for returning the image converted in the step S604 to the original.

In a case where the inference process for another captured image is performed, the image processing apparatus 100 executes the steps S601 to S607. As described above, the parameters of the neural network 204, which are obtained by the learning process performed for each correction condition of image processing, are stored in the parameter storage areas 208-1 to 208-$n$. Then, the parameter selection section 502 selects, based on a correction condition of image processing, parameters associated with the correction condition from the parameter storage areas 208-1 to 208-$n$. With this, it is possible to perform the inference process for a captured image using the optimum parameters. As a result, it is possible to obtain an image reduced in noise.

In the above-described processes, the image processing apparatus 100 performs both of the learning process and the inference process. In this respect, an image processing apparatus that performs the learning process and an image processing apparatus that performs the inference process may be separate apparatuses. In this case, for example, the image processing apparatus that performs the learning process (hereinafter referred to as the learning apparatus) has the configuration shown in FIG. 2A or 2B, and the image processing apparatus that performs the inference process (hereinafter referred to as the inference apparatus) has the configuration shown in FIG. 5. In this case, the image processing apparatus that performs the learning process and the image processing apparatus that performs the inference process are communicably connected to each other.

The inference apparatus acquires the learned parameters from the learning apparatus and stores the acquired parameters in the different parameter storage areas 208, respectively, similarly to the above-described controller 209. Then, the inference apparatus performs the process in FIG. 6. As described above, even when the image processing apparatus that performs the learning process and the image processing apparatus that performs the inference process are separate apparatuses, it is possible to obtain the same advantageous effects as provided in the case where the image processing apparatus that performs the learning process and the image processing apparatus that performs the inference process are the same apparatus.

In a first embodiment, ISO sensitivity correction is taken as an example of image processing, and a description will be given of an example of parameters of a learning model, which are obtained by the learning process performed using a teacher image and a training image subjected to ISO sensitivity correction using correction values respectively associated with a plurality of ISO sensitivities Further, in the first embodiment, a description will be given of an example of parameters of the learning model, which are obtained by the learning process performed by also taking a temperature condition into account.

In the first embodiment, the above-described configuration is used. First, ISO sensitivity correction will be described. The ISO sensitivity correction is correction processing for performing sensitivity correction on an analog gain determined by a combination of a column amplifier and a ramp circuit, on a combination-by-combination basis, so as to obtain a target ISO brightness. The target ISO brightness is a reference sensitivity defined by the International Organization for Standardization. Here, there are a plurality of combinations each of a column amplifier and a ramp circuit, and the optimum correction value of ISO sensitivity is different for each combination. Therefore, in a case where the ISO sensitivity correction is performed by the inference process, if only one type of parameters subjected to the learning process are stored, the inference accuracy is reduced. To prevent this, the image processing apparatus 100 stores the parameters subjected to the learning process for each combination of the column amplifier and the ramp circuit.

Further, the optimum correction value of the analog gain is different also depending on the temperature. That is, in a case where the ISO sensitivity correction is performed by the inference process, the optimum parameters are different also depending on the temperature. Therefore, in the present embodiment, the image processing apparatus 100 may also store parameters associated with the ISO sensitivity and the temperature.

Figure 7A:
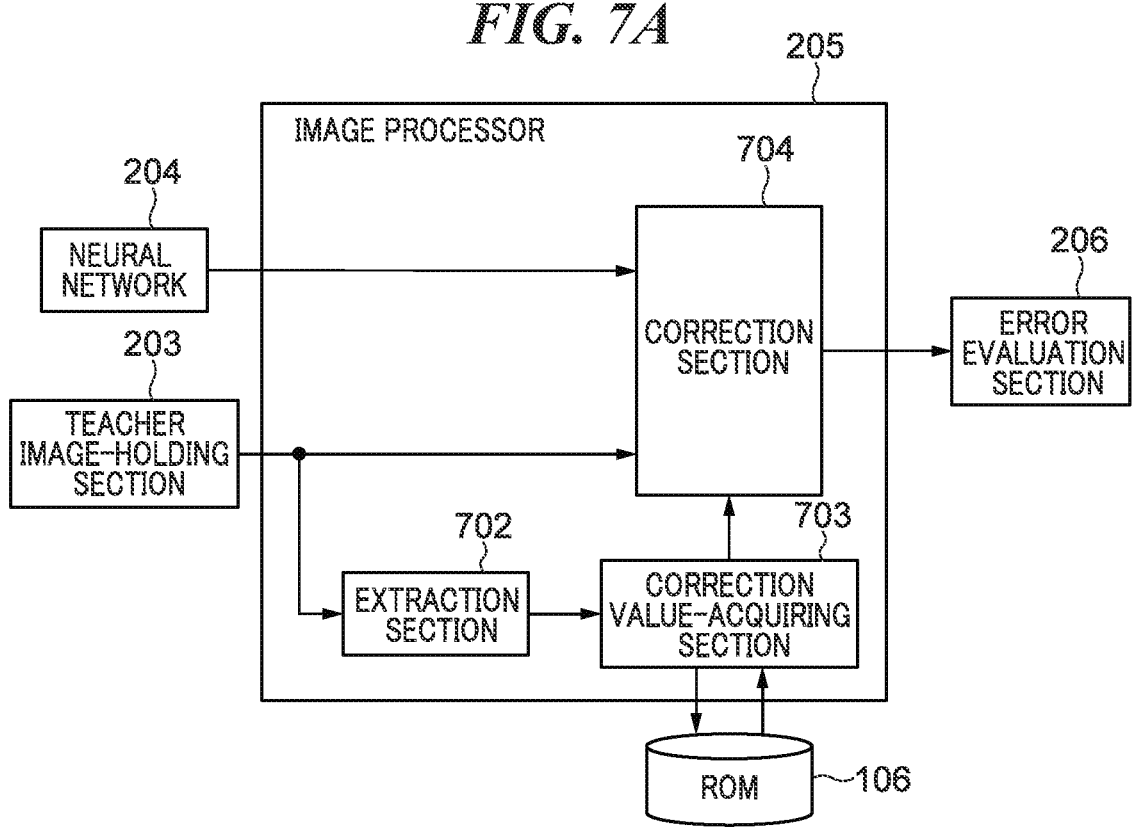
FIGS. 7A and 7B are functional block diagrams of an image processor.
Figure 7B:
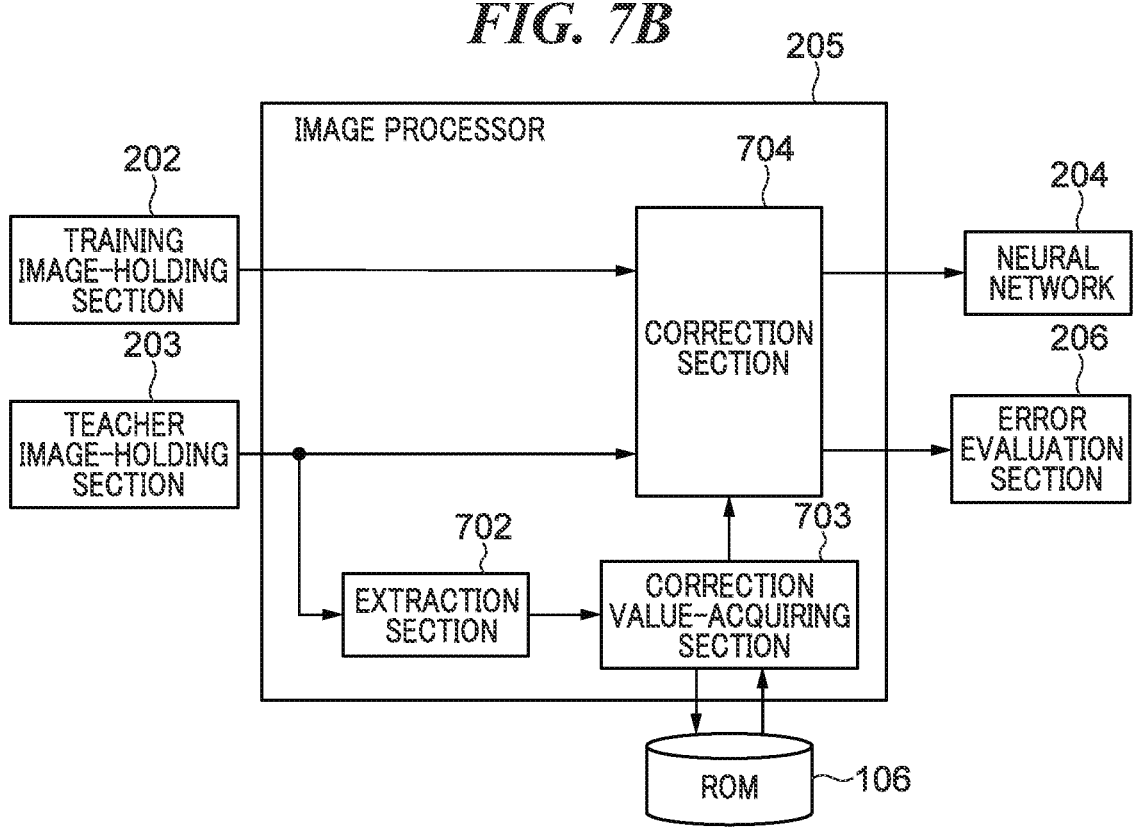

FIGS. 7A and 7B are functional block diagrams of the image processor 205 of the present embodiment. FIG. 7A is a diagram in a case where the neural network 204 is arranged on the input side of the image processor 205. FIG. 7B is a diagram in a case where the neural network 204 is arranged on the output side of the image processor 205. In the case shown in FIG. 7A, input to the image processor 205 are a teacher image from the teacher image-holding section 203 and an output image from the neural network 204. In the case shown in FIG. 7B, input to the image processor 205 are a training image from the training image-holding section 202 and a teacher image from the teacher image-holding section 203. In FIG. 7A, the output image processed by the neural network 204 using the training image as the input is input to the image processor 205. On the other hand, in FIG. 7B, a training image which has not been processed by the neural network 204 is input. Processing subsequent thereto is the same between the cases shown in FIGS. 7A and 7B. As shown in FIGS. 7A and 7B, the image processor 205 has an extraction section 702, a correction value-acquiring section 703, and a correction section 704.

The extraction section 702 extracts metadata from a teacher image. The metadata is information added to the teacher image and includes ISO sensitivity information concerning the ISO sensitivity and temperature information on the temperature. In the present embodiment, the extraction section 702 extracts the ISO sensitivity information and the temperature information as the metadata of the teacher image. The metadata may be information added to an image in an EXIF (Exchange Image File Format). However, the metadata is not limited to data in the EXIF.

The correction value-acquiring section 703 acquires ISO sensitivity correction data associated with the extracted ISO sensitivity information and temperature information from the ROM 106. Data of correction values associated with respective combinations of ISO sensitivities and temperatures is stored in the ROM 106. The ROM 106 may store data of correction values associated with not the above-mentioned combinations, but data of correction values associated with ISO sensitivities. The correction section 704 performs the ISO sensitivity correction on an output image from the neural network 204 and a teacher image, using the ISO sensitivity correction data acquired by the correction value-acquiring section 703. The output image and the teacher image, which are subjected to the ISO sensitivity correction, are output to the error evaluation section 206.

Next, a first example of the ISO sensitivity correction will be described. FIGS. 8A and 8B are diagrams showing a first example of analog gains. FIG. 8A shows an example of an ideal analog gain. FIG. 8B shows an example of an actual analog gain. The analog gain is determined by a combination of the column amplifier and the ramp circuit. The analog gain shown in FIG. 8B has values varying from those of the analog gain shown in FIG. 8A. Therefore, the correction section 704 corrects the analog gain.

For example, when attention is paid to ISO 1, as shown in the illustrated example in FIG. 8A, the analog gain in a case where the column amplifier has a gain value of 0.6 and the ramp circuit has a gain value of 0.85 has an ideal value of 0.51 (=0.6×0.85). On the other hand, in the illustrated example in FIG. 8B, the column amplifier has a gain value of 0.59 and the ramp circuit has a gain value of 0.84, and hence the analog gain has a value of 0.50=0.59×0.84. Therefore, the correction value of the ISO sensitivity correction for ISO 1 is equal to 1.02 (=0.51/0.50).

When attention is paid to ISO 9, as shown in the illustrated example in FIG. 8A, in a case where the column amplifier has a gain value of 8.0 and the ramp circuit has a gain value of 1.00, the analog gain has an ideal value of 8.00 (=8.0×1.00)". On the other hand, in the illustrated example in FIG. 8B, the column amplifier has a gain value of 7.88 and the ramp circuit has a gain value of 0.97, and hence the analog gain has a value of 7.64 (=7.88×0.97)". Therefore, the correction value of the ISO sensitivity correction for ISO 9 is equal to 1.047=8.00/7.64".

As described above, the correction value of the ISO sensitivity correction is different for each ISO sensitivity. Therefore, the correction section 704 performs the ISO sensitivity correction using a correction value corresponding to the ISO sensitivity information of the metadata extracted from the teacher image. The ROM 106 stores a correction value of the ISO sensitivity correction for each ISO sensitivity. The correction value of the ISO sensitivity correction for each ISO sensitivity may be stored e.g. in the RAM 107 or the storage device 140. Although FIG. 8B shows the example in which the actual analog gain is lower than the ideal analog gain, the actual analog gain may be higher than the ideal analog gain.

Figure 9A:
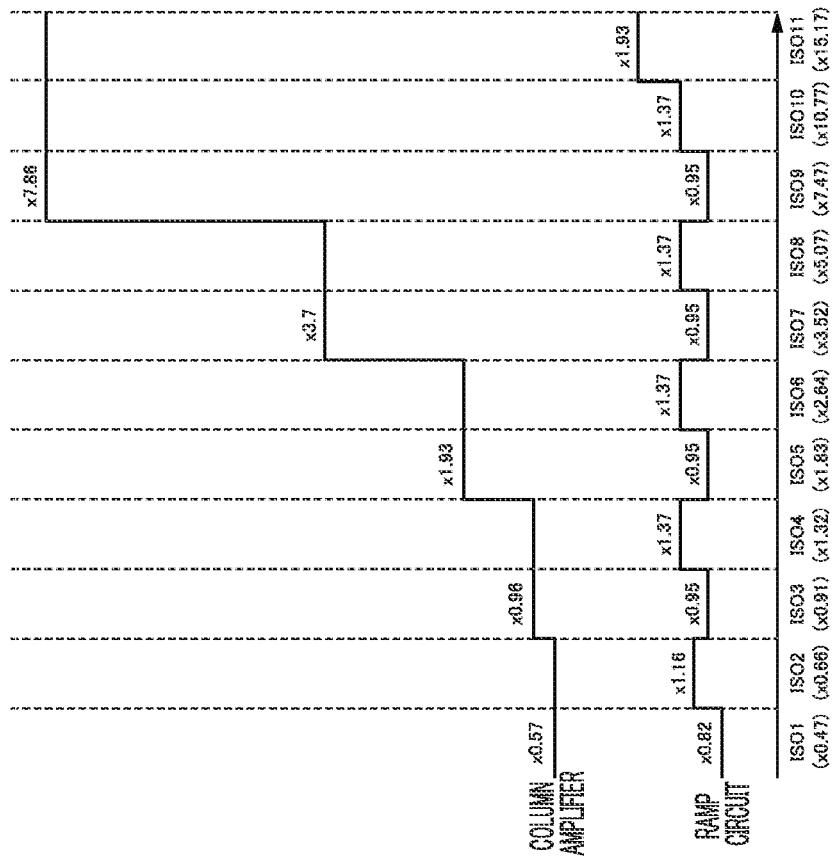
FIGS. 9A and 9B are diagrams showing a second example of the analog gains.
Figure 9B:
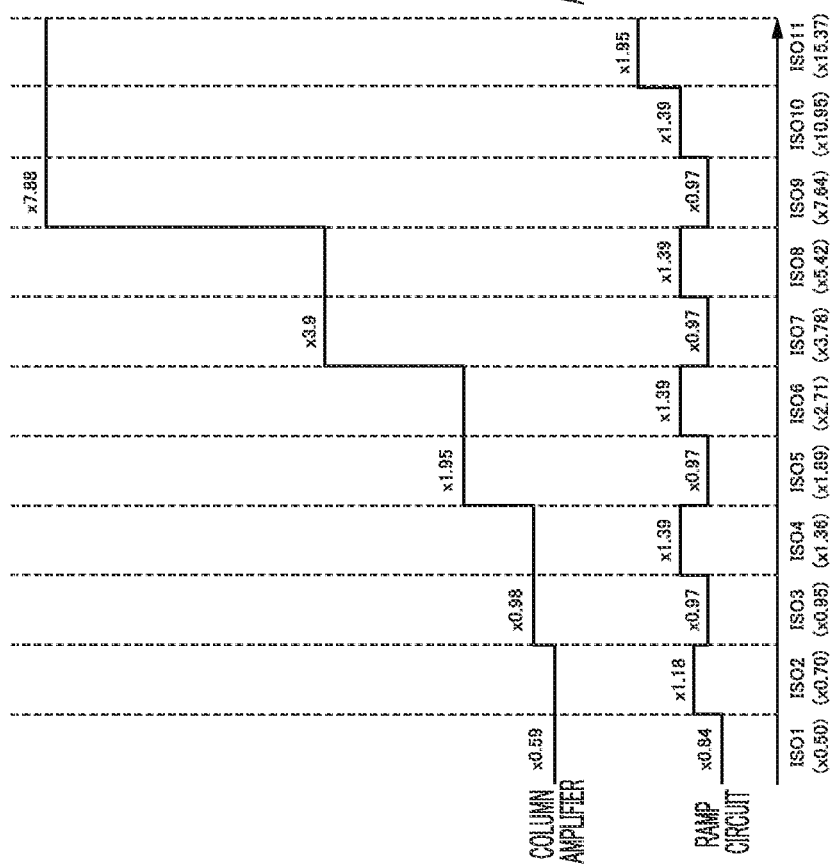

Next, a second example of the ISO sensitivity correction will be described. FIGS. 9A and 9B are diagrams showing the second example of the analog gains. The analog gains shown in FIGS. 9A and 9B have characteristics varying with the temperature. For this reason, the correction value of the ISO sensitivity correction is also different depending on the temperature. This is ascribable to the temperature characteristics of a channel amplifier. Therefore, the ROM 106 may store a correction value for each combination of the ISO sensitivity and the temperature.

Here, in a case where the ROM 106 stores the correction values with respect to all temperatures, the number of correction values stored in the RM 106 increases. In this case, the number of combinations each of an ISO sensitivity and a temperature increases, and the number of parameters stored in the parameter storage areas 208 also increases. As a result, the amount of data taking up the parameter storage areas 208 becomes large. Therefore, the ROM 106 may store correction values each for a predetermined collective range of temperatures.

For example, the ROM 106 may store a common correction value for each of three types of temperature ranges: a first temperature range (low temperature lower than 0° C.), a second temperature range (temperature from 0° C. to 40° C.), and a third temperature range (high temperature higher than 40° C.). In a case where the correction values for the three types of temperature ranges are used for each ISO value as mentioned above, a total of 33 (=11×3) correction values are stored in the ROM 106. With this, one common correction value is used for a plurality of temperatures (such as the temperatures from 0° C. to 40° C.), and hence it is possible to reduce the number of parameters stored in the parameter storage areas 208 and hence reduce the amount of data taking up the parameter storage areas 208. Note that the temperature range setting method and the number of temperature ranges are not limited to the above-mentioned example. For example, the temperature range may be variably set according to a degree of change of the analog gain, caused by the temperature. In this case, the temperature range may be set to be narrow in a section in which the degree of the above-mentioned change is not lower than a predetermined degree and may be set to be wide in a section in which the degree of the above-mentioned change is lower than the predetermined degree.

Figure 10:
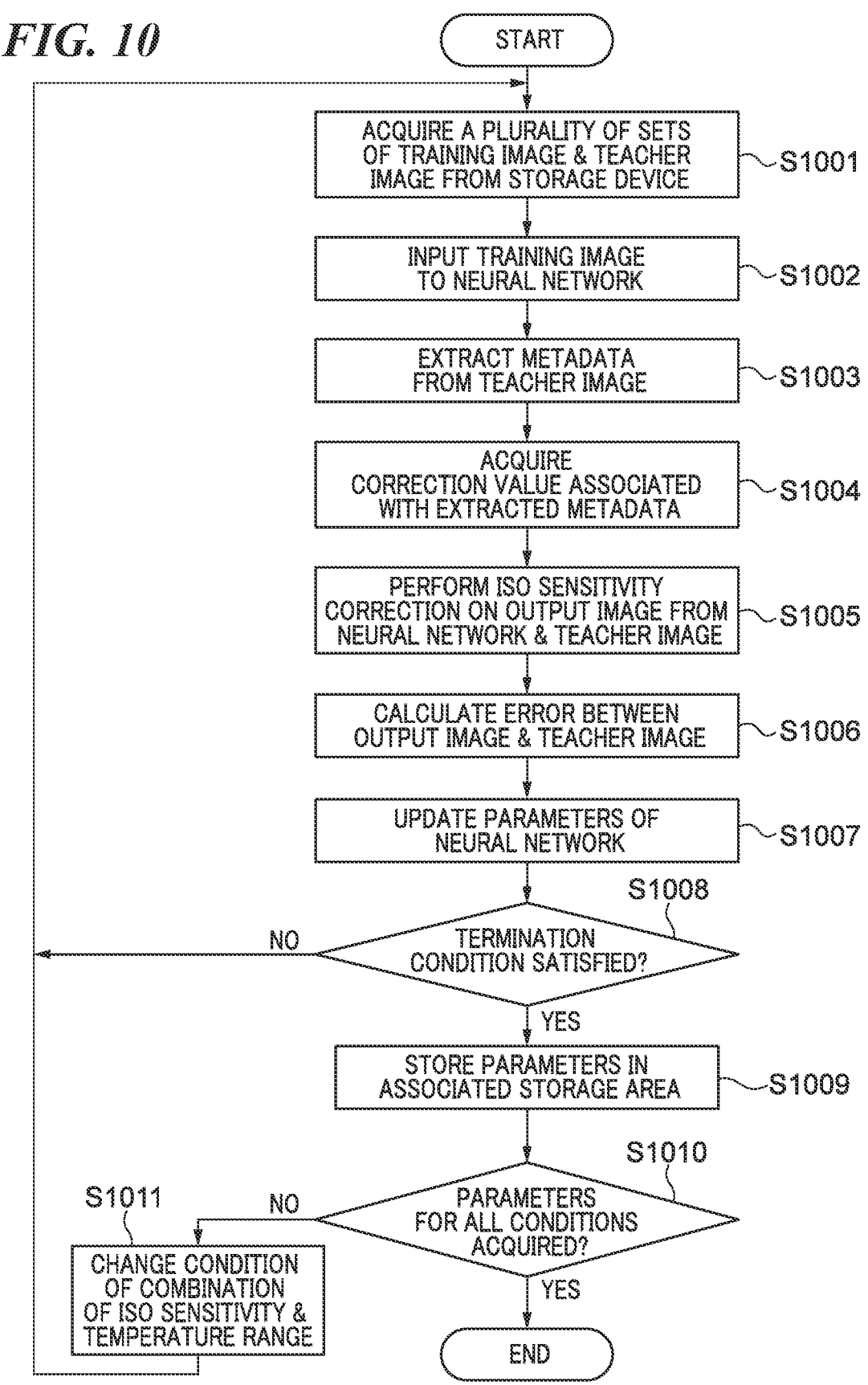
FIG. 10 is a flowchart of a flow of a learning process in a first embodiment.

Next, an example of the learning process in the first embodiment will be described. FIG. 10 is a flowchart of a flow of the learning process in the first embodiment. The process in FIG. 10 is associated with the block diagram shown in FIG. 7A. In a step S1001, the controller 209 acquires pairs of training images and teacher images (learning set) from the storage device 201. The step S1001 corresponds to the step S301 in FIG. 3. In a step S1002, the controller 209 inputs a training image of one of the plurality of acquired learning sets to the neural network 204. An output image is generated by the process performed by the neural network 204. The step S1002 corresponds to the step S302 in FIG. 3.

In a step S1003, the extraction section 702 of the image processor 205 extracts metadata from the teacher image. In a step S1004, the correction value-acquiring section 703 acquires a correction value associated with a combination of ISO sensitivity information and temperature information in the extracted metadata, from the ROM 106. In a step S1005, the correction section 704 performs the ISO sensitivity correction using the acquired correction value on the teacher image and the output image from the neural network 204. The output image from the neural network 204 is an image generated by the neural network 204 performing the process on the training image.

In a step S1006, the error evaluation section 206 calculates an error between the output image and the teacher image which have been subjected to image processing. The step S1006 corresponds to the step S304 in FIG. 3. In a step S1007, the parameter adjustment section 207 updates the parameters of the neural network 204 by back propagation such that the calculated error is reduced. The step S1007 corresponds to the step S305 in FIG. 3. In a step S1008, the controller 209 determines whether or not a predetermined termination condition is satisfied. The step S1008 corresponds to the step S306 in FIG. 3. If the answer to the question of the step S1008 is negative (NO), since the predetermined termination condition is not satisfied, the controller 209 returns to the step S1001. On the other hand, if the answer to the question of the step S1008 is affirmative (YES), since the predetermined termination condition is satisfied, the controller 209 proceeds to a step S1009.

In the step S1009, the controller 209 stores the updated parameters (learned parameters) in one of the parameter storage areas 208 which is associated with the applied correction condition of ISO sensitivity correction. The correction condition of ISO sensitivity correction of the present embodiment is a correction value associated with a combination of an ISO sensitivity and a temperature range. In a case where the temperature information is not used, the correction condition of ISO sensitivity correction of the present embodiment is a correction value associated with each ISO sensitivity. The controller 209 stores the updated parameters in one of the parameter storage areas 208 which is associated with the applied combination of the ISO sensitivity and the temperature range. The step S1009 corresponds to the step S307 in FIG. 3. In a step S1010, the controller 209 determines whether or not the parameters have been acquired with respect to all of the correction conditions. At this time, the controller 209 performs the determination in the step S1010 based on whether or not all combinations of ISO sensitivities and temperature ranges have been acquired. If the answer to the question of the step S1010 is affirmative (YES), the controller 209 terminates the process in FIG. 10. On the other hand, if the answer to the question of the step S1010 is negative (NO), the controller 209 proceeds to a step S1011. In the step S1011, the controller 209 changes the condition of the combination of an ISO sensitivity and a temperature range. Then, the controller 209 returns to the step S1001. With this, the learning process is newly performed with respect to the changed combination of an ISO sensitivity and a temperature range.

Figure 11:
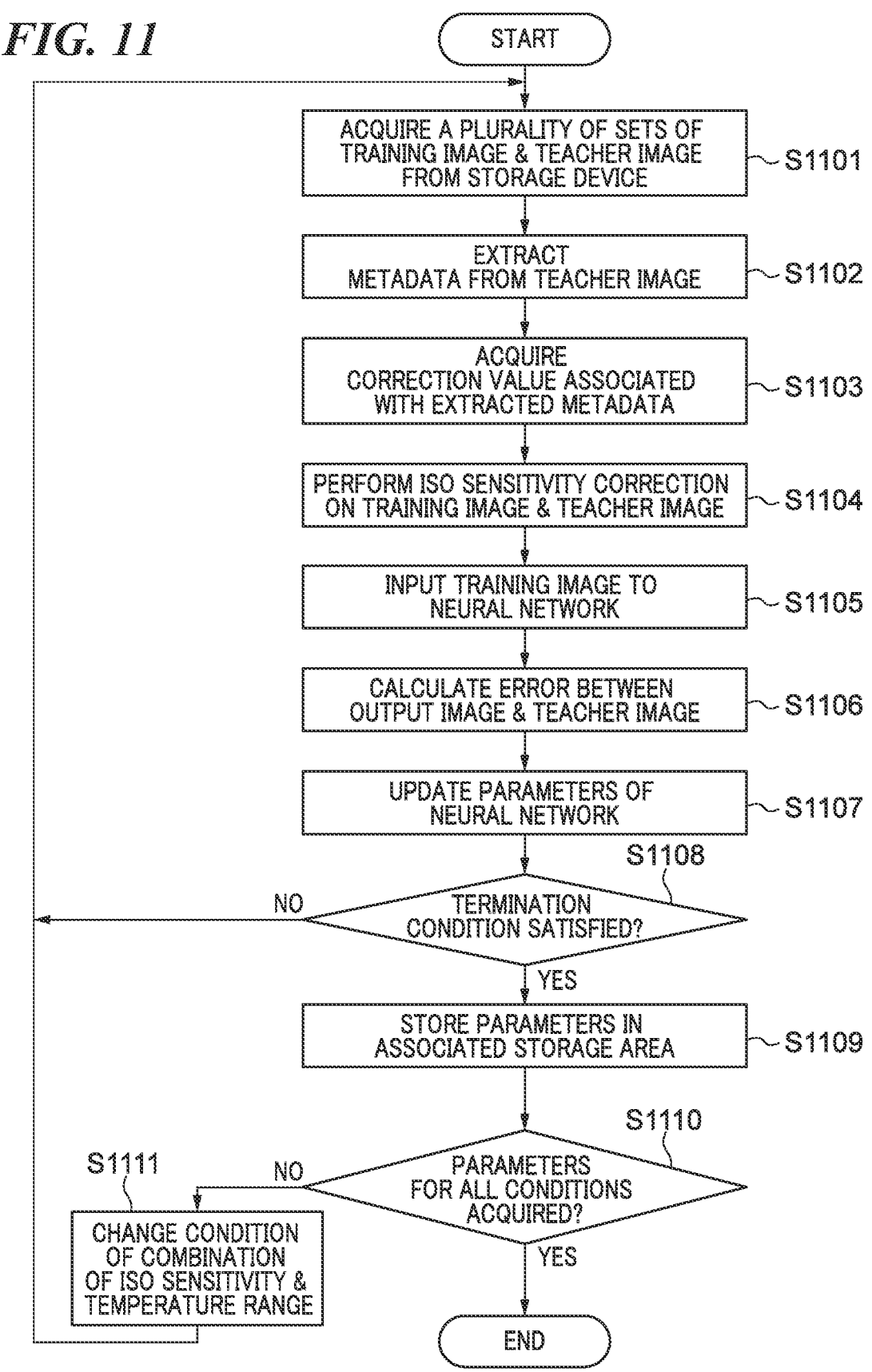
FIG. 11 is a flowchart of a flow of a variation of the learning process in the first embodiment.

Next, another example of the flow of the process in the first embodiment will be described. FIG. 11 is a flowchart of a flow of a variation of the learning process in the first embodiment. The process in FIG. 11 is associated with the block diagram shown in FIG. 7B. In the process in FIG. 10, the ISO sensitivity correction is performed on an output image from the neural network 204, whereby the learning process is performed. On the other hand, in the process in FIG. 11, the ISO sensitivity correction is performed on a training image input to the neural network 204, whereby the learning process is performed.

A step S1101 corresponds to the step S1001. In a step S1102, the extraction section 702 of the image processor 205 extracts metadata from the teacher image. In a step S1103, the correction value-acquiring section 703 acquires a correction value associated with a combination of ISO sensitivity information and temperature information in the extracted metadata from the ROM 106. The step S1102 corresponds to the step S1003, and the step S1103 corresponds to the step S1004. In a step S1104, the correction section 704 performs the ISO sensitivity correction on the teacher image and the training image. That is, the correction section 704 performs the ISO sensitivity correction on the training image which has not been processed by the neural network 204.

In a step S1105, the controller 209 inputs the training image subjected to the ISO sensitivity correction to the neural network 204. An output image is generated by the process performed by the neural network 204 using the training image subjected to the ISO sensitivity correction as the input. In a step S1106, the error evaluation section 206 calculates an error between the teacher image subjected to the ISO sensitivity correction and the output image generated in the step S1105. In a step S1107, the parameter adjustment section 207 updates the parameters of the neural network 204 by back propagation such that the calculated error is reduced. Steps S1108 to S1111 are the same as the steps S1008 to S1011 in FIG. 10, and hence description thereof is omitted.

The process in FIG. 10 and the process in FIG. 11 each show the flow of the learning process associated with a combination of the ISO sensitivity information and the temperature information in the first embodiment. In the step S1004 in FIG. 10 or the step S1103 in FIG. 11, the correction value-acquiring section 703 acquires a correction value associated with a combination of ISO sensitivity information and temperature information in extracted metadata from the ROM 106. At this time, the correction value-acquiring section 703 may acquire the ISO sensitivity information from the ROM 106 and is not required to acquire the temperature information. For example, in a case where the temperature information is not stored in the ROM 106, the correction value-acquiring section 703 acquires the ISO sensitivity information from the ROM 106 and does not acquire the temperature information. Even in this case, it is also possible to perform the ISO sensitivity correction using the correction value of each ISO sensitivity.

Figure 12:
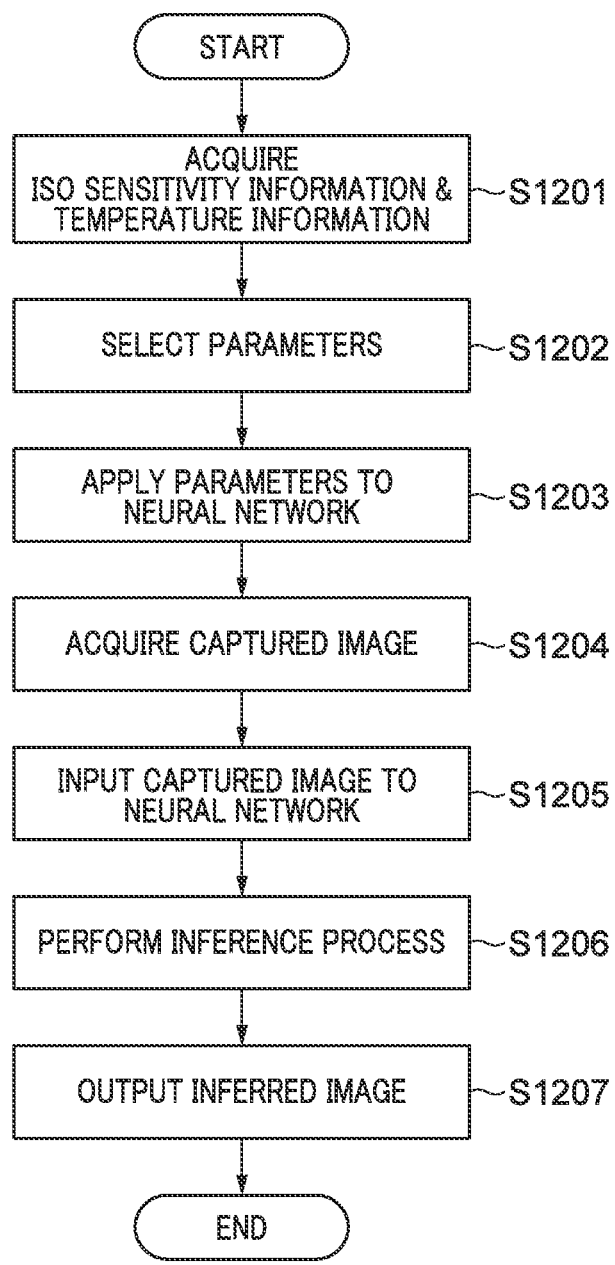
FIG. 12 is a flowchart of a flow of an inference process in the first embodiment.

Next, the inference process in the first embodiment will be described. FIG. 12 is a flowchart of a flow of the inference process in the first embodiment. In a step S1201, the acquisition section 501 acquires ISO sensitivity information and temperature information. The acquisition section 501 can acquire the ISO sensitivity information and the temperature information from the image capturing apparatus 120. For example, the acquisition section 501 can acquire the ISO sensitivity information based on the settings of the image capturing apparatus 120. Further, in a case where the image capturing apparatus 120 has a temperature measuring function, such as that of a thermistor, the acquisition section 501 can acquire the temperature information from a temperature measured by the thermistor of the image capturing apparatus 120. The acquisition section 501 may acquire the ISO sensitivity information and the temperature information from the metadata of image data stored in the storage device 140.

In a step S1202, the parameter selection section 502 selects parameters associated with the combination of the acquired ISO sensitivity information and temperature information from one of the parameter storage areas 208-1 to 208-$n$. In a step S1203, the controller 504 applies the selected parameters to the neural network 204. This makes it possible to perform the inference process using the neural network 204. Steps S1204 to S1207 are the same as the steps S604 to S607 in FIG. 6, and hence description thereof is omitted.

In the first embodiment, parameters of the neural network 204, which are obtained by the learning process performed according to ISO sensitivities are stored in the parameter storage areas 208-1 to 208-$n$. Then, the parameter selection section 502 selects associated parameters from the parameter storage areas 208-1 to 208-$n$ based on the condition of the ISO sensitivity. This makes it possible to perform the inference process on a captured image using the parameters adapted to the condition of the ISO sensitivity and hence the inference accuracy is improved. As a result, it is possible to obtain an image reduced in noise. Further, in the first embodiment, the learning process is performed by further taking the temperature condition into account. That is, it is also possible to store the parameters of the neural network 204, which are obtained by the learning process performed according to the combinations each of an ISO sensitivity and a temperature range in the parameter storage areas 208-1 to 208-$n$, respectively. Then, the parameter selection section 502 selects associated parameters from the parameter storage areas 208-1 to 208-$n$ based on both conditions of the ISO sensitivity and the temperature. This makes it possible to perform the inference process on a captured image using parameters adapted to the characteristics of the ISO sensitivity and the characteristics of the temperature, and hence it is possible to further increase the inference accuracy. As a result, it is possible to further enhance the effect of reduction of noise in an image.

In a second embodiment, F-number correction is taken as an example of image processing, and a description will be given of an example of parameters of a learning model for which the learning process is performed using a teacher image and a training image subjected to F-number correction using correction values respectively associated with a plurality of F-numbers.

Figure 13A:
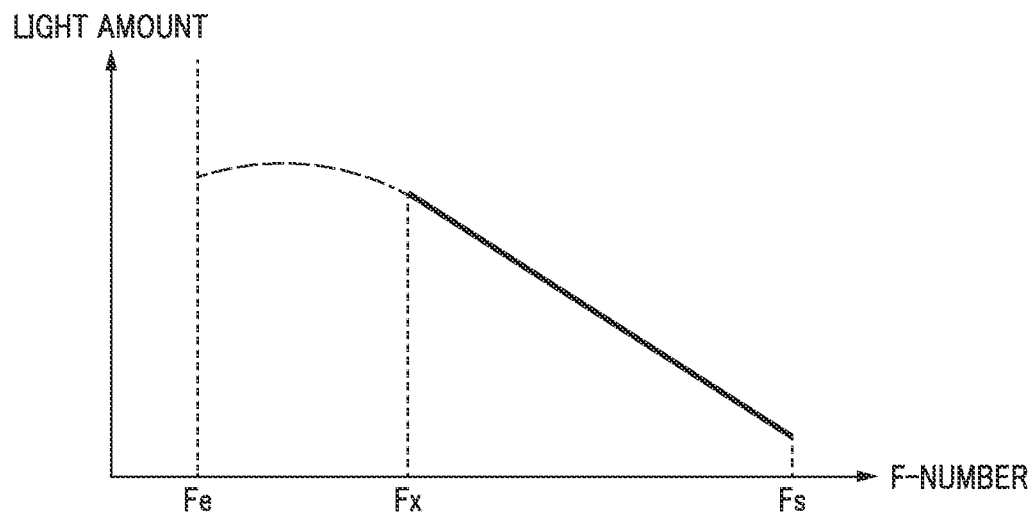
FIGS. 13A and 13B are diagrams showing examples of a relationship between an F-number and a light amount and a relationship between the F-number and a correction value, respectively.
Figure 13B:
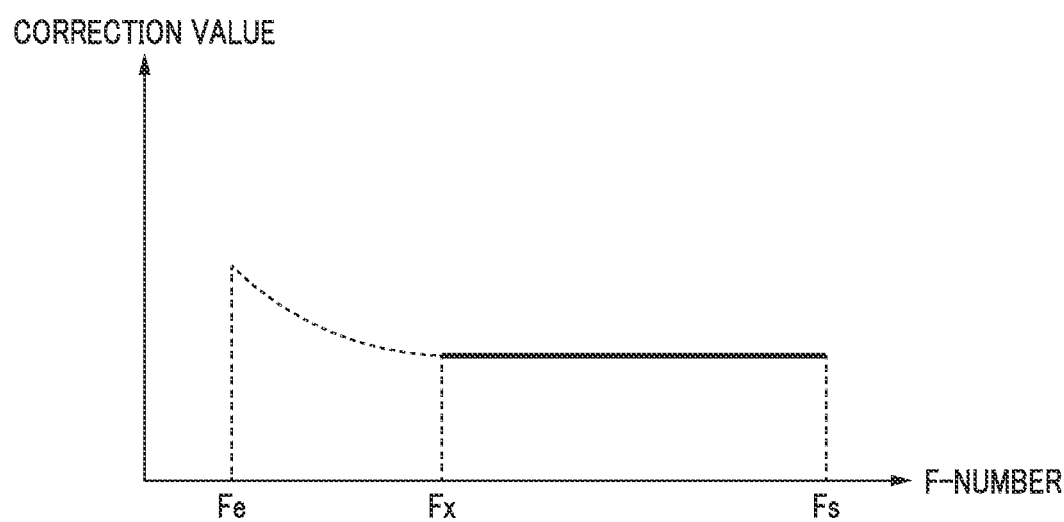

The F-number correction is correction for applying a gain to an image such that in a case where a relationship between an F-number as an aperture value and a light amount (luminance) is not linear, the relationship between the F-number and the light amount (luminance values) is made closer to linearity. FIGS. 13A and 13B are graphs showing an example of the relationship between the F-number and the light amount and an example of the relationship between the F-number and the correction value, respectively. FIG. 13A is a graph showing the relationship between the F-number and the light amount. A horizontal axis represents the F-number, and a vertical axis represents the amount of light received by the image capturing device 122 of the image capturing apparatus 120. As mentioned above, the F-number correction is processing for applying a gain according to an aperture value (F-number) of the lens unit 121. Here, when the aperture is changed from a small aperture side to an open side, the relationship between the F-number and the light amount (luminance) shows a linear relationship on the small aperture side, but the relationship between the F-number and the light amount (luminance) shows a non-linear relationship on the open side. One of factors responsible for the non-linear relationship between the F-number and the light amount (luminance) on the open side is that light entering obliquely to the image capturing device 122 cannot be sufficiently captured on the open side. To overcome this inconvenience, in a section in which the F-number is on the open side, F-number correction in which an image signal is multiplied by a gain is performed to make the relationship between the F-number and the light amount close to an ideal linearity. Since the F-number correction is performed in the section on the open side, noise is generated in the image.

In FIG. 13A, the relationship between the F-number and the light amount in a section of the F-number from Fx to Fs linearly changes as indicated by a solid line. On the other hand, the relationship between the F-number and the light amount in a section of the F-number from Fe to Fx non-linearly changes as indicated by a dashed-dotted line. In view of this, as mentioned above, the light amount is multiplied by a correction value in the section from Fe to Fx (hereinafter referred to as the non-linear section) so as to removing noise, such that the relationship between the F-number and the light amount is made linear even in the section in which the relationship is non-linear. The correction value in the non-linear section is not a fixed value as shown I FIG. 13B. On the other hand, in the section from Fx to Fs (hereinafter referred to as the linear section), the light amount is multiplied by a correction value which is a fixed value. That is, the correction value in the non-linear section is required to be changed to a suitable value according to an F-number such that the relationship between the F-number and the light amount is made closer to linearity. In FIG. 13B, the correction values in the non-linear section are indicated by a dot line.

Figure 14:
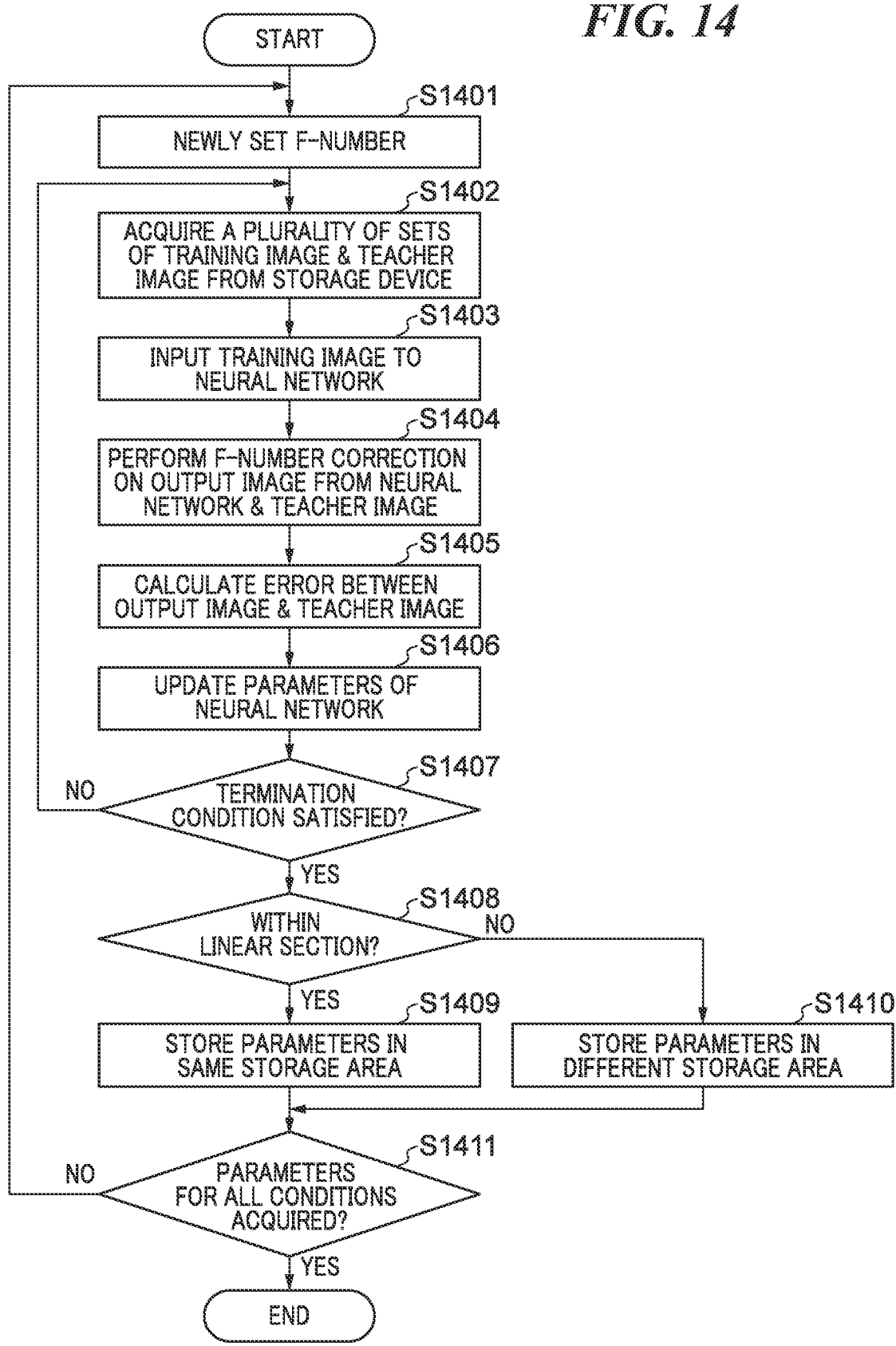
FIG. 14 is a flowchart of a flow of a learning process in a second embodiment.

Next, an example of the learning process in the second embodiment will be described. FIG. 14 is a flowchart of a flow of the learning process in the second embodiment. The process in FIG. 14 corresponds to the functional block diagram shown in FIG. 7A, and the correction section 704 of the image processor 205 performs the F-number correction. In a step S1401, the controller 209 newly sets a F-number for use in performing the learning process. In a step S1402, the controller 209 acquires pairs of training images and teacher images (learning sets) from the storage device 201. In a step S1403, the controller 209 inputs a training image of one of the plurality of acquired learning sets to the neural network 204. An output image is generated by the process performed by the neural network 204. A noise amount and a noise pattern of the training image are sometimes different from a noise amount and a noise pattern of the other training images or sometimes the same as those.

In a step S1404, the image processor 205 performs the F-number correction on the teacher image and the output image from the neural network 204. In doing this, the image processor 205 performs the F-number correction using a correction value associated with the F-number set in the step S1401. As mentioned above, the image processor 205 may be arranged on the output side of the neural network 204 as shown in FIG. 2A or may be arranged on the input side of the neural network 204 as shown in FIG. 2B. That is, the step S1404 may be executed before the step S1403. Note that if the extraction section 702 of the image processor 205 is configured to acquire an F-number from the metadata of the teacher image, the step S1401 can be omitted. In a step S1405, the error evaluation section 206 calculates an error between the output image and the teacher image which have been subjected to the F-number correction. In a step S1406, the parameter adjustment section 207 updates the parameters of the neural network 204 by back propagation such that the calculated error is reduced. In a step S1407, the controller 209 determines whether or not a predetermined termination condition is satisfied. If the answer to the question of the step S1407 is negative (NO), the controller 209 returns to the step S1402. In this case, the steps S1402 to S1406 are executed using a new learning set of a training image and a correct answer image. On the other hand, if the answer to the question of the step S1407 is affirmative (YES), the controller 209 proceeds to a step S1408.

In the step S1408, the controller 209 determines whether or not the F-number set in the step S1401 is in the linear section. The linear section will be further referred to hereinafter. If the answer to the question of the step S1408 is affirmative (YES), the controller 20) proceeds to a step S1409. In the step S1409, the controller 209 stores the updated parameters (learned parameters) in the same parameter storage area 208. On the other hand, if the answer to the question of the step S1408 is NO, the controller 209 proceeds to a step S1410. In the step S1410, the controller 209 stores the updated parameters (learned parameters) in a different parameter storage area 208 according to the F-number set in the step S1401. In the steps S1409 and S1410, the controller 209 may store the parameters updated by machine learning and information concerning the model structure of the neural network 204 in the parameter storage area 208 in association with the condition of the F-number set in the step S1401. In a step S1411, the controller 209 determines whether or not the parameters have been acquired with respect to all conditions of the F-number. If the answer to the question of the step S1411 is negative (NO), the controller 209 returns to the step S1401 and newly sets a condition of the F-number. If the answer to the question of the step S1411 is affirmative (YES), the controller 209 terminates the process in FIG. 14.

As described above, the controller 209 performs control for performing machine learning (deep learning) of the neural network 204 by changing the F-number that is corrected. With this, the machine learning is performed by reflecting the correction value for each F-number thereon, whereby the parameters are updated. In the step S1408 in FIG. 14, the controller 209 determines whether or not the F-number set when the machine learning is performed is in the linear section. For example, the controller 209 can perform the determination in the step S1408 based on whether or not the set F-number is not smaller than the above-mentioned Fx. Although the value of Fx (predetermined threshold value) may be set to a desired value, it is preferable that the value of Fx is set at a boundary at which the relationship between the F-number and the light amount changes from the linear relationship to the non-linear relationship. However, the value of Fx may be set to a value within a predetermined range from the boundary.

Then, if the answer to the question of the step S1408 is affirmative (YES), the controller 209 stores the updated learned parameters in the same parameter storage area 208 out of the parameter storage areas 208-1 to 208-$n$. Even if the parameters are parameters updated with respect to a different F-number, if the answer to the question of the step S1408 is affirmative (YES), the controller 209 stores the updated learned parameters in the same parameter storage area 208. Alternatively, in a case where the answer to the question of the step S1408 is affirmative (YES), if the updated parameters have once been stored, the step S1409 may be omitted for the second and subsequent times. On the other hand, if the answer to the question of the step S1408 is negative (NO), the controller 209 stores the updated learned parameters in the different parameter storage areas 208 according to the different F-numbers, respectively. The controller 209 sequentially stores the updated learned parameters in the different parameter storage area 208 (such as the parameter storage areas 208-2 to 208-$n$) whenever the step S1410 is executed.

Therefore, in the section in which the F-number and the light amount (luminance) are in a non-linear relationship, it is possible to execute the inference process using the parameters of the neural network 204 associated with F-numbers having a fine granularity. This improves the inference accuracy. On the other hand, in the section in which the F-number and the light amount (luminance) are in a linear relationship, the inference process is executed using one kind of parameters of the neural network 204. This makes it possible to reduce the number of stored parameters, and hence it is possible to reduce the amount of data and reduce the used amount of the hardware resources, such as the storage device 140 and the RAM 107. That is, since the image processing apparatus 100 changes the granularity of the stored parameters according to the F-number, it is possible to reduce the amount of data while suppressing reduction of the inference accuracy.

Although in the above-described example, in the non-linear section, the image processing apparatus 100 stores the parameters of the machine-learned neural network 204 for each F-number, this is not limitative. For example, in the non-linear section, the image processing apparatus 100 may store the learned parameters for each driving resolution of the diaphragm provided in the lens unit 121 of the image capturing apparatus 120. Further, the image processing apparatus 100 performs both of the learning process and the inference process. The image processing apparatus that performs the learning process and the image processing apparatus that performs the inference process may be separate apparatuses. In this point, the present embodiment is the same as the first embodiment, and the following embodiments are also the same.

In this case, for the linear section, the inference apparatus acquires and stores one kind of learned parameters, and for the non-linear section, acquires and stores learned parameters associated with each of a plurality of aperture values.

Then, the inference apparatus performs the process in FIG. 6. As mentioned above, even when the image processing apparatus that performs the learning process and the image processing apparatus that performs the inference process are separate apparatuses, it is possible to obtain the same advantageous effects.

Figure 15:
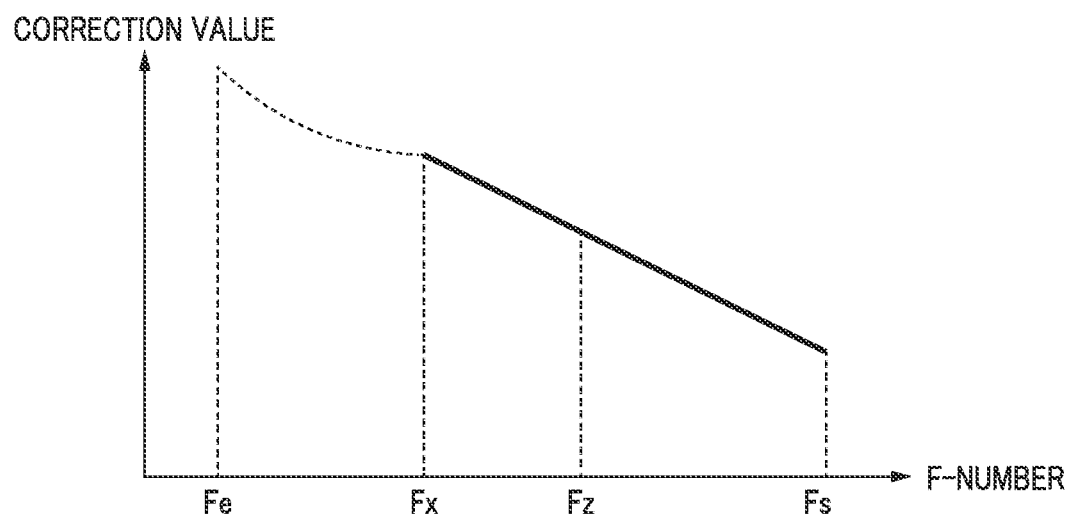
FIG. 15 is a diagram showing another example of the relationship between the F-number and the correction value.

Next, a variation of the second embodiment will be described. FIG. 15 is a diagram showing an example of the relationship between the F-number and the correction value in the variation of the second embodiment. Although in the second embodiment, the correction value in the section of the F-number from Fx to Fs is fixed, in the variation of the second embodiment, the correction value in the section of the F-number from Fx to Fs linearly changes. The section of the F-number from Fx to Fs is a section showing the linear relationship between the F-number and the light amount (luminance). In the variation of the second embodiment, the controller 209 stores the parameters (first parameters) obtained by setting the F-number to Fx and performing the process in FIG. 14 and the parameters (second parameters) obtained by setting the F-number to Fs and performing the process in FIG. 14, in respective parameter storage areas 208.

Then, as shown in FIG. 15, when the inference process on a captured image in a case where the F-number is set to Fz is performed, the controller 504 performs interpolation using an inferred image generated using the first parameters and an inferred image generated using the second parameters. With this, it is possible to obtain an inferred image concerning a desired F-number in the section from Fx to Fs in which the correction value linearly changes. In this case, the number of kinds of parameters (machine-learned parameters) stored to obtain an inferred image with respect to a desired F-number in the section from Fx to Fs is two.

Here, the controller 504 may perform the process in FIG. 14 using two desired F-numbers in the section from Fx to Fs, in which the correction value linearly changes, and store the first parameters and the second parameters. In this case, it is also possible to obtain an inferred image with respect to the desired F-numbers in the section from Fx to Fs in which the correction value linearly changes by performing interpolation using an inferred image generated using the first parameters and an inferred image generated using the second parameters.

Figure 16:
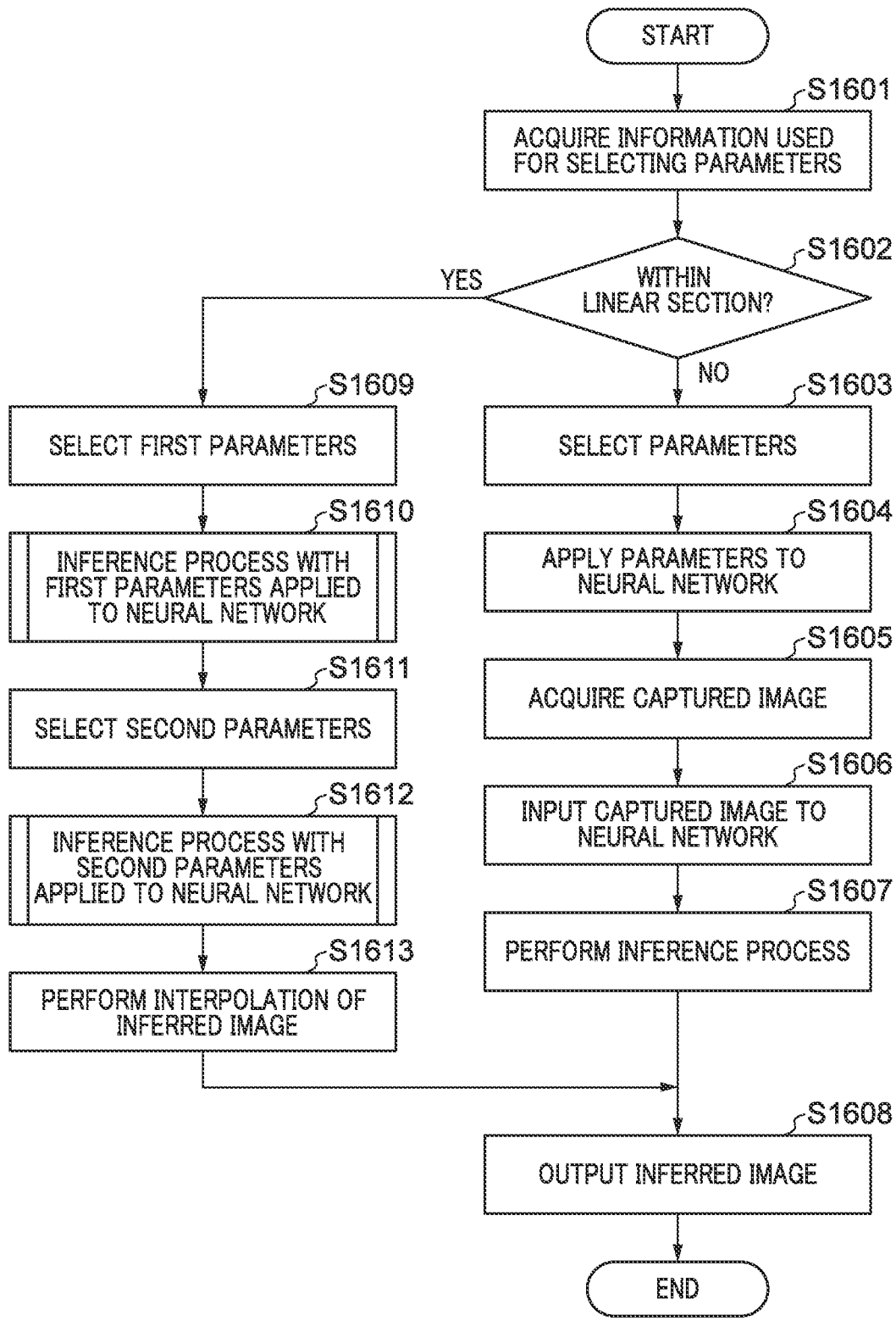
FIG. 16 is a flowchart of a flow of an inference process in a variation of the second embodiment.

FIG. 16 is a flowchart of a flow of an inference process in the variation of the second embodiment. In a step S1601, the acquisition section 501 acquires information on the F-number from the image capturing apparatus 120. In a step S1602, the controller 504 determines whether or not the F-number indicated by the acquired information is within the linear section. As mentioned above, the controller 504 may determine that the answer to the question of the step S1602 is negative (NO) if the F-number indicated by the information acquired in the step S1601 is not smaller than Fx (not smaller than the predetermined threshold value) and determines that the answer to the question of the step S1602 is affirmative (YES) if the F-number is smaller than Fx (smaller than the predetermined threshold value). If the controller 504 determines that the answer to the question of the step S1602 is negative (NO), in a step S1603, the parameter selection section 502 selects parameters associated with the acquired information on the F-number from the parameter storage areas 208-1 to 208-*n*. The parameters stored in the parameter storage areas 208-1 to 208-*n* are parameters updated according to the different conditions of the F-numbers including Fx and Fs, respectively. The parameter selection section 502 acquires the parameters associated with an F-number which is the same as the acquired information on the F-number or an F-number which is the closest to the acquired information on the F-number.

In a step S1604, the controller 504 applies the selected parameters to the neural network 204. This makes it possible to perform the inference process using the neural network 204. In a step S1605, the acquisition section 501 acquires a captured image from the image capturing apparatus 120. It is assumed that this captured image is a RAW image. In a case where the RAW image has been encoded, the CPU 105 or the image processing circuit 103 performs decoding. The acquisition section 501 may acquire a RAW image e.g. from the storage device 140, the ROM 106, or the RAM 107.

In a step S1606, the controller 504 inputs the acquired captured image to the neural network 204. In a step S1607, the neural network 204 performs the inference process. The inference process by the neural network 204 may be executed by the GPU 109 or the CPU 105, or may be executed by a cooperative operation of the CPU 105 and the GPU 109. By performing the inference process in the step S1607, an inferred image is generated as a result of the inference process by the neural network 204. In a step S1608, the inferred image output section 503 outputs the generated inferred image to the storage device 140. The inferred image output section 503 may output the generated inferred image to the ROM 106, the RAM 107, the display section 130, or the like. At this time, the parameters selected in the step S1603 are learned parameters which are obtained by the learning process performed using the F-number within the non-linear section.

If the answer to the question of the step S1602 is affirmative (YES), the controller 504 proceeds to a step S1609. In the step S1609, the parameter selection section 502 selects the above-mentioned first parameters associated with Fx. For example, in a case where the first parameters have been stored in the parameter storage area 208-1, the parameter selection section 502 selects the above-mentioned first parameters from the parameter storage area 208-1. In a step S1610, the neural network 204 executes the inference process to which the first parameters are applied. The step S1610 corresponds to the steps S1604 to S1607. That is, the inference process is executed with respect to the neural network 204 to which the first parameters are applied using the captured image as an input. With this, an inferred image (first inferred image) is generated by the inference process performed by the neural network 204 to which the first parameters are applied.

In a step S1611, the parameter selection section 502 selects the above-mentioned second parameters associated with Fs. For example, in a case where the second parameters have been stored in the parameter storage area 208-2, the parameter selection section 502 selects the second parameters from the parameter storage area 208-2. Then, the neural network 204 executes the inference process to which the second parameters are applied. A step S1612 corresponds to the steps S1604 to S1607. That is, the inference process is executed by the neural network 204 to which the second parameters are applied using the captured image as an input. With this, an inferred image (second inferred image) is generated by the inference process performed by the neural network 204 to which the second parameters are applied.

In a step S1613, the controller 504 executes interpolation of the inferred image. In doing this, the controller 504 executes interpolation by combining the first inferred image and the second inferred image. Further, the controller 504 executes interpolation by assigning respective weights to the first inferred image and the second inferred image, using the F-number indicated by the information acquired in the step S1601 as a reference. For example, in a case where the F-number indicated by the information acquired in the step S1601 is close to the F-number (Fx) associated with the first parameters, the controller 504 may execute interpolation by increasing the weight assigned to the first inferred image. On the other hand, in a case where the F-number indicated by the information acquired in the step S1601 is close to the F-number (Fs) associated with the second parameters, the controller 504 may execute interpolation by increasing the weight assigned to the second inferred image. When interpolating the first inferred image and the second inferred image, the controller 504 may perform interpolation for each pixel or may perform interpolation for each of areas generated by dividing the whole image into desired ranges. Then, in the step S1608, the controller 504 outputs an inferred image obtained by interpolation.

As described above, in the variation of the second embodiment, even when the correction value is not fixed in the section in which the correction value linearly changes, it is possible to obtain the same advantageous effects as provided by the second embodiment. In the variation of the second embodiment, the two kinds of parameters. i.e. the first parameters and the second parameters subjected to the learning process, are used. The F-number associated with the first parameters and the F-number associated with the second parameters, applied when performing the learning process, may be selected according to the linearity of the correction value. Further, in the second embodiment, the controller 504 may further divide the section in which the F-number and the light amount (luminance) have a linear relationship (section from Fx to Fs) into a plurality of sections. In this case, the controller 504 may set the divided section as one processing unit and execute interpolation with respect to the two kinds of parameters for each processing unit.

In a third embodiment, color suppression processing and color curving correction are taken as an example of image processing, and a description will be given of an example of parameters of a learning model for which the learning process is performed using a teacher image and a training image subjected to image processing using corrections values associated with a plurality of color suppression processing operations or a plurality of color curving correction operations, respectively.

In a case where an image of a high-luminance object is captured by an image capturing apparatus, one of RGB signals output from the image capturing device is sometimes saturated. In this case, the ratio of the RGB signals sometimes changes from values indicating the original colors of the object. To solve this problem, there has been proposed a method of mitigating changes in the color of high-luminance part, caused by saturation of a signal, by applying color suppression processing which is processing for lowering chroma with respect to an area where one of the RGB signals is saturated.

Further, in a case where an image of an object with a low luminance and a high chroma is captured by an image capturing apparatus, the signal level of one of the RGB signals sometimes becomes close to a black level as a lower limit. In this case, if gamma correction which is sharp in rise at the black level is applied to the RGB signals, noise components superimposed on the RGB signals are emphasized by the gamma correction, which degrades the image quality. To solve this problem, there has been known a method of increasing the value of a signal, small in signal value, of the RGB signals, by applying color suppression processing to a lower limit area where any of the RGB signals takes a value close to the lower limit. This makes it possible to reduce the degree of emphasis of noise components, caused by gamma correction.

Since the color suppression processing is processing for reducing chroma, noise in the area to which the processing is applied is reduced. Therefore, by performing color suppression processing when the learning process is performed, it is possible to obtain a neural network which takes noise reduced by the color suppression processing into account. Further, the characteristics of color suppression processing are changed by gamma correction and color gamut conversion. Therefore, in a case where the output format input at the time of learning and the output format input at the time of inference are different, the characteristics of color suppression processing are also different, and hence the inference accuracy of an inferred image is reduced.

Further, an image viewed by a user has been subjected to gamma correction and color gamut conversion adapted to the output format. At this time, a color different from an original color of an object is output depending on the color of the object. Processing for correcting the color by applying again on a color-by-color basis to suppress this color change is referred to as color curving correction. How the color changes is different depending on gamma correction and color gamut conversion. That is, the characteristics of color curving correction are changed depending on the output format. Therefore, in the case where the output format input at the time of learning and the output format of an image input at the time of inference are different, the characteristics of color curving correction are also different, and hence the inference accuracy of an inferred image is reduced.

Figure 17:
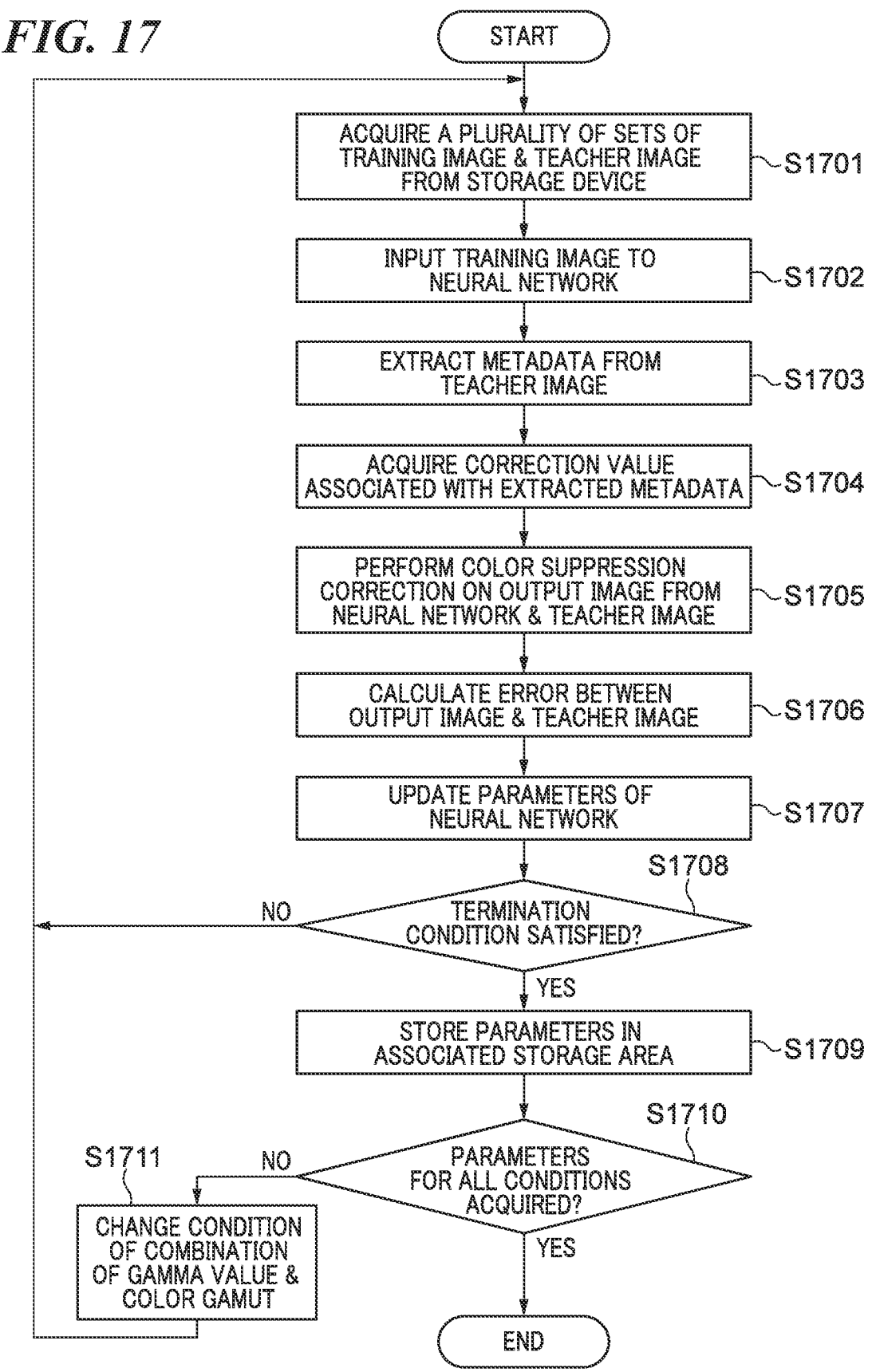
FIG. 17 is a flowchart of a flow of a learning process in a third embodiment.

Next, an example of the learning process in the third embodiment will be described. FIG. 17 is a flowchart of a flow of the learning process in the third embodiment. The process in FIG. 17 can be implemented by using the configuration shown in the functional block diagram in FIG. 2A or 7A. The correction section 704 of the image processor 205 performs development processing and color suppression processing, described hereinafter. Here, although the learning process is described based on a case where color suppression processing is performed as image processing, the learning process is similarly performed in a case where color curving correction is performed in place of color suppression processing.

In a step S1701, the controller 209 acquires pairs of training images and teacher images (learning sets) from the storage device 201. In a step S1702, the controller 209 inputs a training image of one of the plurality of acquired learning sets to the neural network 204. An output image is generated by the process performed by the neural network 204. In a step S1703, the extraction section 702 of the image processor 205 extracts metadata concerning a gamma value, a color gamut, or a combination of the gamma value and the color gamut from the teacher image. The gamma value may be a value assumed to be subjected to color adjustment, such as color grading, afterwards, or a value aimed to be viewed by a user (such as PQ and HLG). Further, the color gamut may be based on BT. 2020, BT. 709, or DCI-P3, or may be adapted to the display characteristics of the display device 130 (such as 2.2 and 2.4). Further, these may be combined.

In a step S1704, the correction value-acquiring section 703 acquires a correction value associated with the gamma value, the color gamut, or the combination of the gamma value and the color gamut in the extracted metadata from the ROM 106. In a step S1705, the correction section 704 performs development processing on the teacher image and an output image from the neural network 204 to thereby convert each image into a color space, such as YCC or ICtCp, which is separated in luminance and hue. Note that the development processing may include debayer processing performed on an image in a Bayer array. Further, the correction section 704 performs color suppression correction using the acquired correction value on the teacher image and the output image which have been subjected to development processing.

In a step S1706, the error evaluation section 206 calculates an error between the output image and the teacher image which have been subjected to image processing. In a step S1707, the parameter adjustment section 207 updates the parameters of the neural network 204 by back propagation such that the calculated error is reduced. In a step S1708, the controller 209 determines whether or not a predetermined termination condition is satisfied. If the answer to the question of the step S1708 is negative (NO), the predetermined termination condition is not satisfied, and hence the controller 209 returns to the step S1701. On the other hand, if the answer to the question of the step S1708 is affirmative (YES), the predetermined termination condition is satisfied, and hence the controller 209 proceeds to a step S1709.

In the step S1709, the controller 209 stores the updated parameters (learned parameters) in one of the parameter storage areas 208 which is associated with the applied correction condition of color suppression processing. The correction condition of color suppression processing of the present embodiment is a correction value associated with a combination of a gamma value and a color gamut. The controller 209 stores the updated parameters in a different parameter storage area 208 for each combination of a gamma value and a color gamut. If the color gamut has not been changed, parameters different for each gamma value are stored in different parameter storage areas 208. In a step S1710, the controller 209 determines whether or not the parameters have been acquired with respect to all conditions. At this time, the controller 209 performs the determination in the step S1710 based on whether or not all combinations each of a gamma value and a color gamut have been acquired. If the answer to the question of the step S1710 is affirmative (YES), the controller 209 terminates the process in FIG. 17. On the other hand, if the answer to the question of the step S1710 is negative (NO), the controller 209 proceeds to a step S1711. In the step S1711, the controller 209 changes the condition of the combination of a gamma value and a color gamut. Then, the controller 209 returns to the step S1701. With this, the learning process is newly performed with respect to the changed combination of a gamma value and a color gamut. Although in FIG. 17, the training image is input to the neural network 204, and the development processing and the color suppression processing are performed on the output image from the neural network 204, this is not limitative. The processing operations may be configured such that the development processing and the color suppression processing are performed on a training image, and then the processed training image is input to the neural network 204. In this case, an output image from the neural network 204, and the teacher image subjected to the development processing and the color suppression processing are input to the error evaluation section 206.

Figure 18:
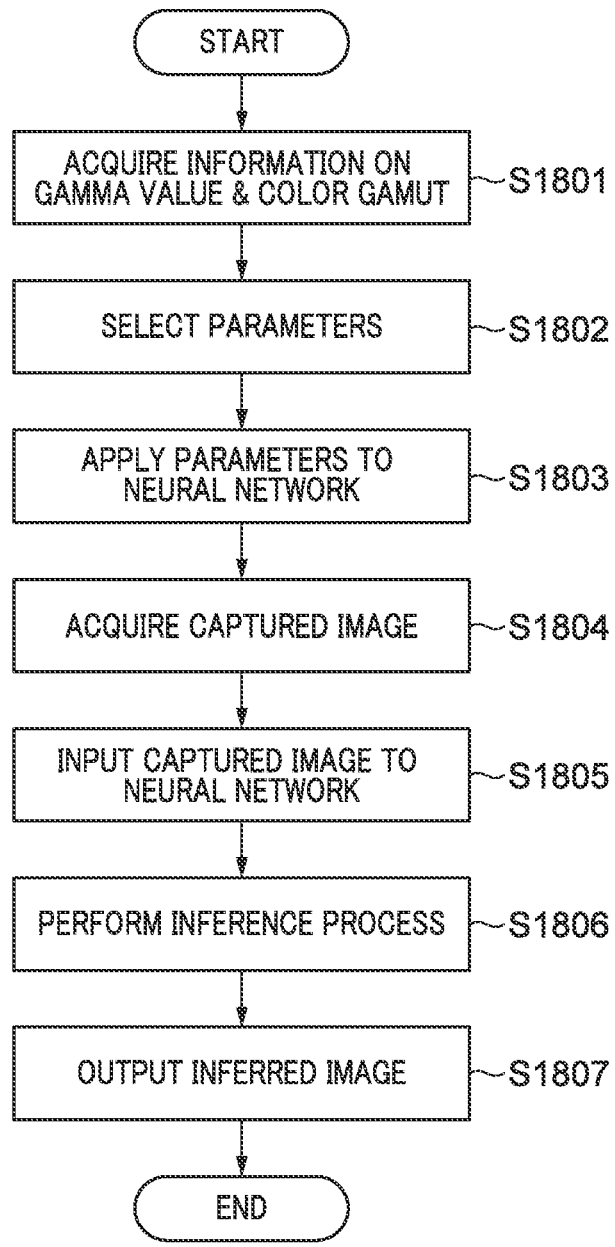
FIG. 18 is a flowchart of a flow of an inference process in the third embodiment.

Next, the inference process in the third embodiment will be described. FIG. 18 is a flowchart of a flow of the inference process in the third embodiment. In a step S1801, the acquisition section 501 acquires information on a gamma value and a color gamut. Alternatively, acquisition of a captured image in a step S1804 may be performed first, and then the information on a gamma value and a color gamut may be acquired from the metadata of the captured image. In a step S1802, the parameter selection section 502 selects parameters associated with the acquired information on a gamma value and a color gamut from the parameter storage areas 208-1 to 208-$n$. In a step S1803, the controller 504 applies the selected parameters to the neural network 204. This makes it possible to perform the inference process by the neural network 204. The step S1804 and steps S1805 to S1807 are the same as the steps S604 to S607 in FIG. 6, and hence description thereof is omitted.

Note that not only in the gamma correction and color gamut conversion, but also in exposure correction, gain correction, and color balance correction for adjusting chroma correction, it is possible to obtain the same advantageous effects by preparing parameters for the neural network, which are associated with a combination of these correction values.

In a fourth embodiment, peripheral light falloff correction is taken as an example of image processing, and a description will be given of an example of parameters of a learning model for which the learning process is performed using a teacher image and a training image subjected to peripheral light falloff correction using correction values respectively associated with a plurality of processing operations of peripheral light falloff correction.

The peripheral light falloff correction is correction of multiplying an image by a gain so as to correct the lens characteristics that a light amount is gradually reduced from the center of the lens toward periphery, and the gain is gradually larger from the center of the lens toward the periphery. Further, the characteristics of peripheral light falloff vary with the conditions of the lens type, the aperture value, the focal length, and the zoom position, and the optimum gain is different for each area.

Figure 19A:
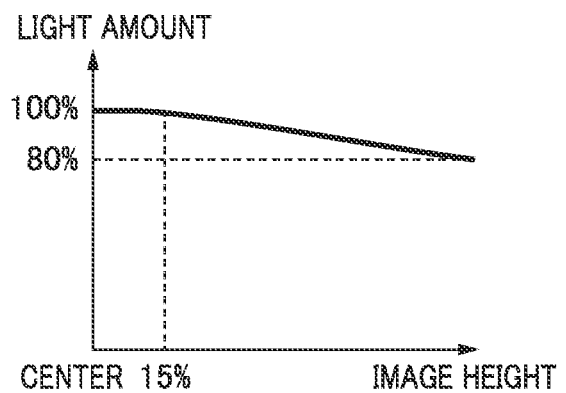
FIGS. 19A to 19D are diagrams each showing how peripheral light falloff occurs.
Figure 19C:
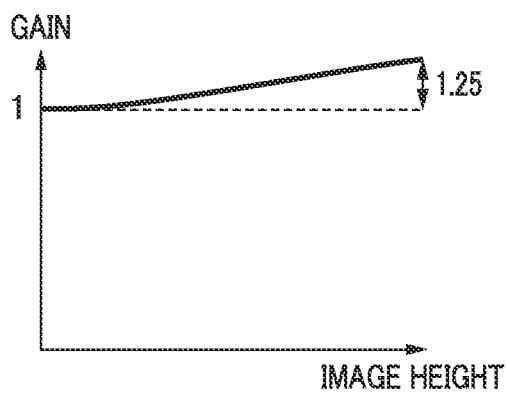
Figure 19B:
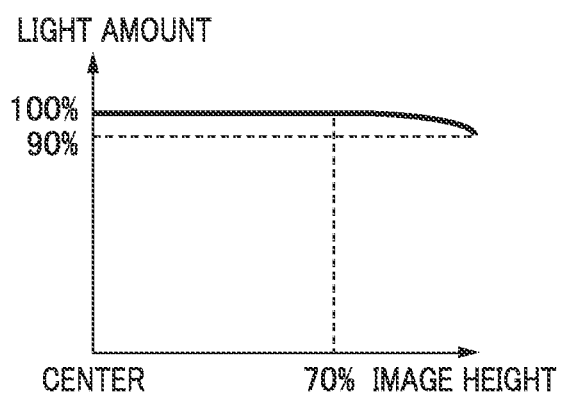

FIGS. 19A to 19D are diagrams each showing a state of peripheral light falloff. A horizontal axis represents an image height which is a distance from the center position of the lens, and the image height at the center position of the lens is defined as 0%, whereas the image height at an outer periphery of an image circle of the lens is defined as 100%. A vertical axis represents a light amount, and the light amount at the center position of the lens is defined as 100%. In FIGS. 19A and 19B, the lens conditions (aperture value, focus, and zoom position) are different therebetween. In FIG. 19A, the light amount at a position corresponding to an image height of 15% is close to 100%, and the light amount at a position corresponding to an image height of 100% is 80%. In FIG. 15B, the light amount at a position corresponding to an image height of 70% is close to 100%, and the light amount at a position corresponding to an image height of 100% is 90%. Thus, the start point where peripheral light falloff starts and a shape, such as inclination, of peripheral light falloff are different depending on a state of the lens.

Figure 19D:
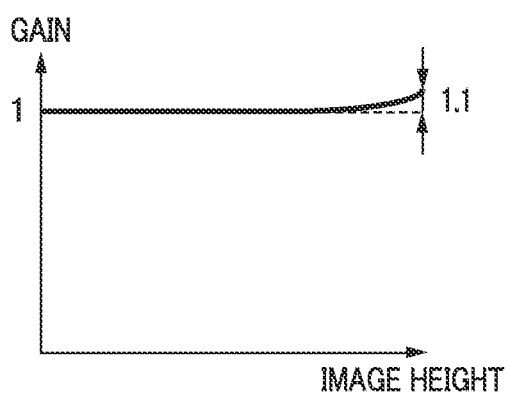

FIG. 19C shows a gain curve for correcting the peripheral light falloff shown in FIG. 19A, and FIG. 19D shows a gain curve for correcting the peripheral light falloff shown in FIG. 19B. A horizontal axis represents an image height and a vertical axis represents a gain. The gain curve shown in FIG. 19C has a shape for making the light amount equal to 1000% at each image height, and a gain of 1.25 is set for a position corresponding to an image height of 100%, whereas in the gain curve shown in FIG. 19D, a gain of 1.1 is set for a position corresponding to an image height of 100%. As the gain is set to a larger value, noise components included in an image are also amplified, and hence an upper limit may be set to the gain.

Figure 20:
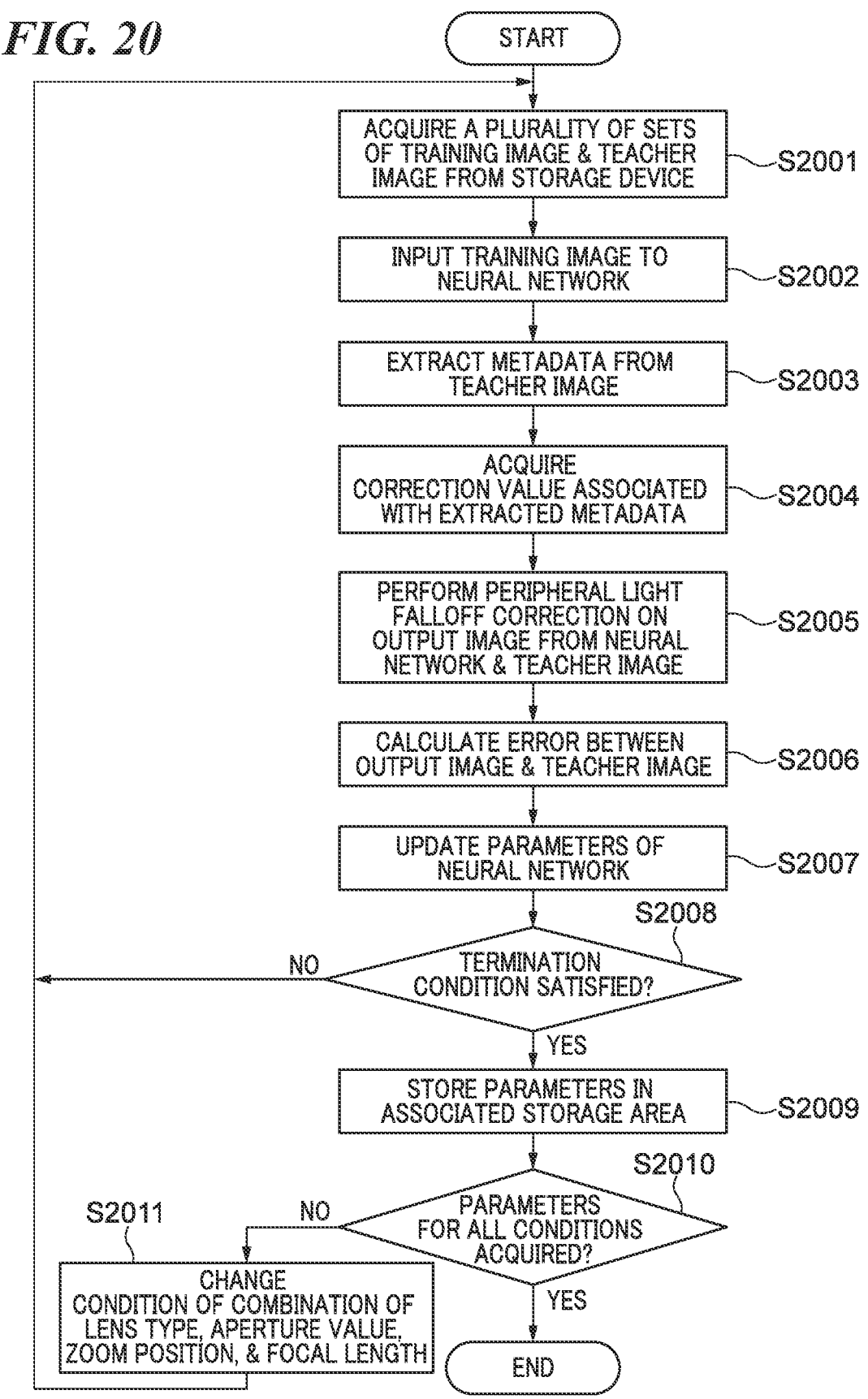
FIG. 20 is a flowchart of a flow of a learning process in a fourth embodiment.

Next, a description will be given of the learning process in the fourth embodiment. FIG. 20 is a flowchart of a flow of the learning process in the fourth embodiment. The process in FIG. 20 can be implemented by using the configuration shown in the functional block diagram in FIG. 2A or 7A. The correction section 704 of the image processor 205 performs the peripheral light falloff correction, described hereinafter.

In a step S2001, the controller 209 acquires pairs of training images and teacher images (learning sets) from the storage device 201. In a step S2002, the controller 209 inputs a training image of one of the plurality of acquired learning sets to the neural network 204. An output image is generated by the process performed by the neural network 204. In a step S2003, the extraction section 702 of the image processor 205 extracts metadata concerning a lens type, an aperture value, a zoom position, and a focal length from the teacher image.

In a step S2004, the correction value-acquiring section 703 acquires a correction value associated with a combination of the extracted lens type, aperture value, zoom position, and focal length, from the ROM 106. In a step S2005, the correction section 704 performs the peripheral light falloff correction on the teacher image and an output image from the neural network 204, using the acquired correction value.

In a step S2006, the error evaluation section 206 calculates an error between the output image and the teacher image, which have been subjected to image processing. Then, in a step S2007, the parameter adjustment section 207 updates the parameters of the neural network 204 by back propagation such that the calculated error is reduced. In a step S2008, the controller 209 determines whether or not a predetermined termination condition is satisfied. If the answer to the question of the step S2008 is negative (NO), the predetermined termination condition is not satisfied, and hence the controller 209 returns to the step S2001. On the other hand, if the answer to the question of the step S2008 is affirmative (YES), the predetermined termination condition is satisfied, and hence the controller 209 proceeds to a step S2009.

In the step S2009, the controller 209 stores the updated parameters (learned parameters) in one of the parameter storage areas 208 which is associated with the applied correction condition of the peripheral light falloff correction. The correction condition of the peripheral light falloff correction of the present embodiment is a correction value associated with a combination of a lens type, an aperture value, a zoom position, and a focal length. The controller 209 stores the updated parameters in a different parameter storage area 208 for each combination of the lens type, the aperture value, the zoom position, and the focal length. Note that if the lens is not an interchangeable lens, but a lens integrated with the image capturing apparatus, it is not necessary to store parameters associated with the lens type. Further, if the lens is a fixed focal length lens without the zoom function, it is not necessary to store parameters associated with the zoom position. In a step S2010, the controller 209 determines whether or not the parameters have been acquired with respect to all conditions. If the answer to the question of the step S2010 is affirmative (YES), the controller 209 terminates the process in FIG. 20. On the other hand, if the answer to the question of the step S2010 is negative (NO), the controller 209 proceeds to a step S2011. In the step S2011, the controller 209 changes the condition of the combination of a lens type, an aperture value, a zoom position, and a focal length. Then, the controller 209 returns to the step S2001.

Figure 21:
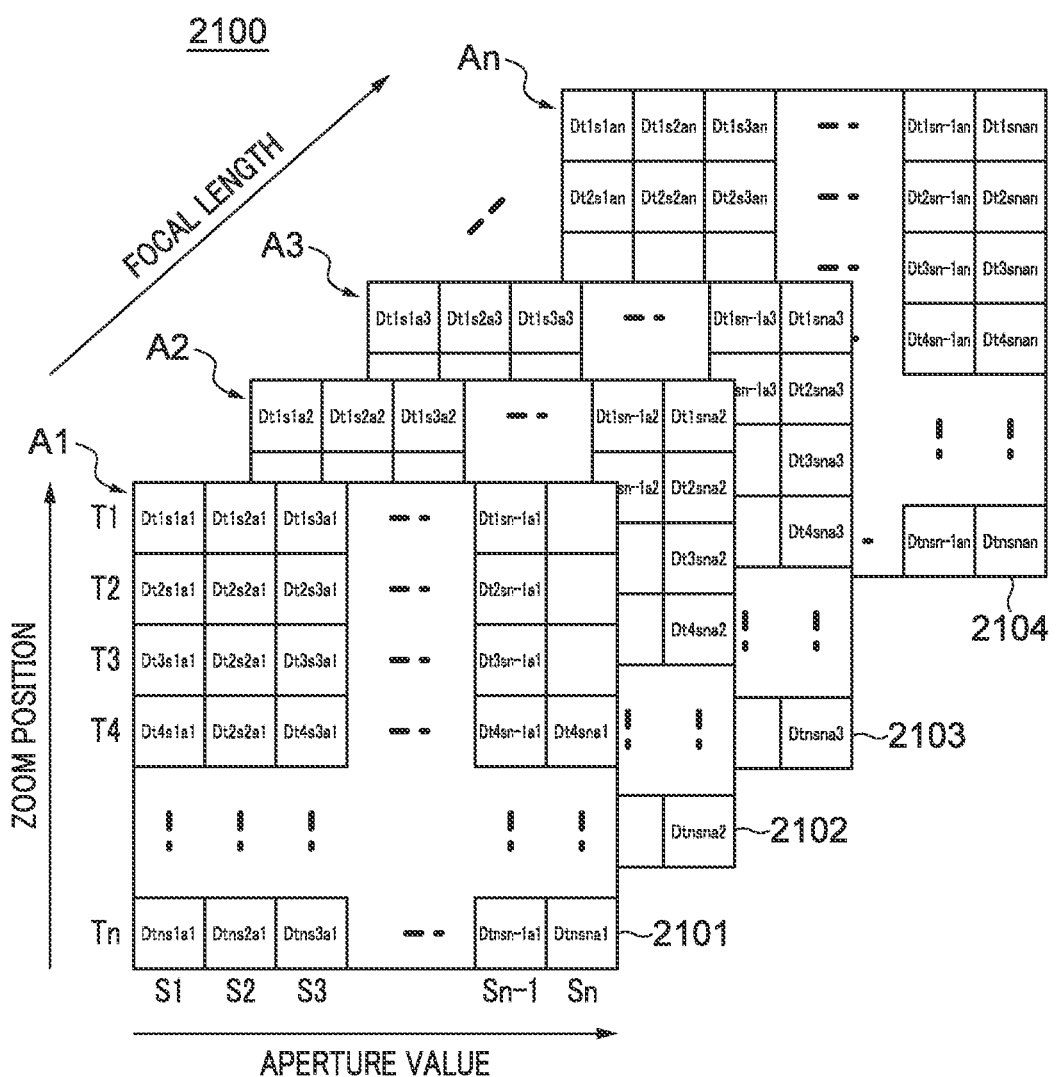
FIG. 21 is a diagram showing an example of table data of peripheral light falloff correction data.

FIG. 21 is a diagram showing an example of table data of peripheral light falloff correction data. The table data, denoted by reference numeral 2100, is a group of data obtained at focal lengths A1 to An. A horizontal axis represents aperture value (S1, S2, S3, . . . . Sn), and a vertical axis represents zoom positions (T1, T2, T3, . . . , Tn). For example, peripheral light falloff correction data at a zoom position of T1, an aperture value of S1, and a focal length of A1 is represented by $Dt1s1a1$. Further, table data items 2101, 2102, 2103, and 2104 are data groups at focal lengths of A1, A2, A3, and An, respectively. The peripheral light falloff correction data associated with each set of lens conditions is stored in the ROM 106. Further, in the interchangeable lens, the shape of the peripheral light falloff is different for each lens, and hence the table data is stored for each lens. The interchangeable lens can be identified by a lens ID allocated to each lens.

Figure 22:
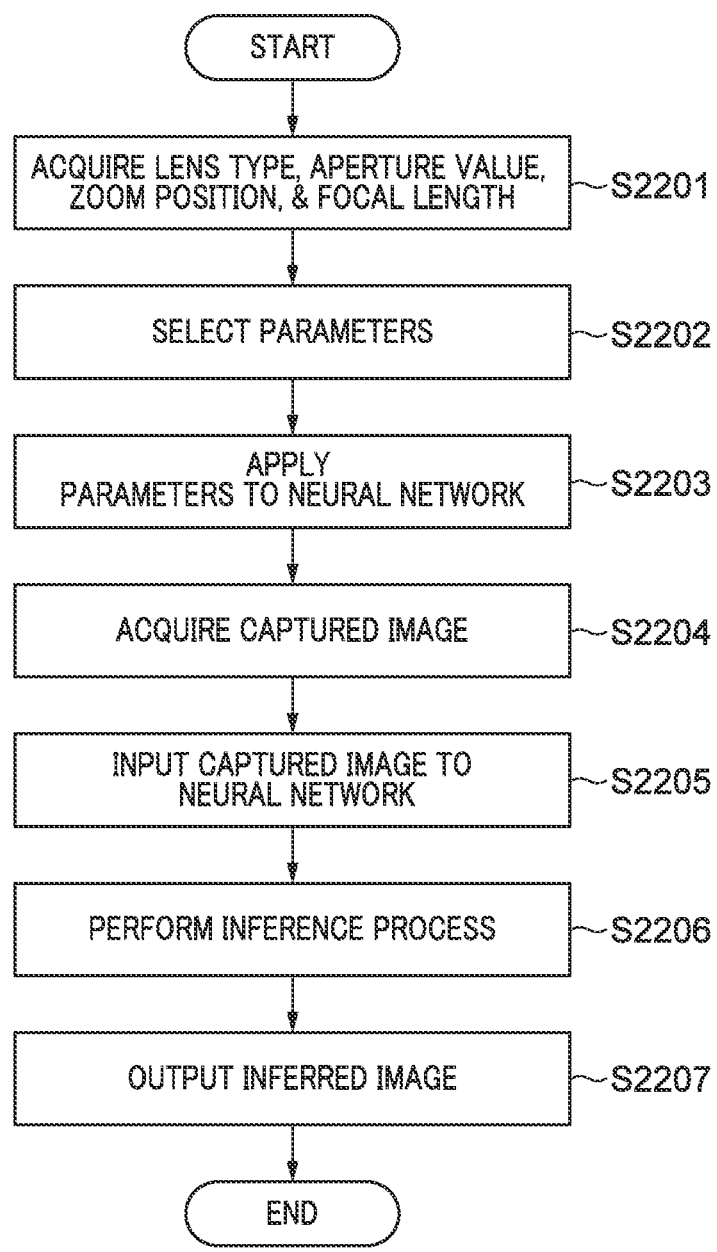
FIG. 22 is a flowchart of a flow of an inference process in the fourth embodiment.

Next, the inference process in the fourth embodiment will be described. FIG. 22 is a flowchart of a flow of the inference process in the fourth embodiment. In a step S2201, the acquisition section 501 acquires information on a lens type, an aperture value, a zoom position, and a focal length. Alternatively, acquisition of a captured image in a step S2204 may be performed first, and then information on a lens type, an aperture value, a zoom position, and a focal length may be acquired from the metadata of the captured image. In a step S2202, the parameter selection section 502 selects parameters associated with the acquired information on the lens type, the aperture value, the zoom position, and the focal length from the parameter storage areas 208-1 to 208-n. Then, in a step S2203, the controller 504 applies the selected parameters to the neural network 204. This makes it possible to perform the inference process using the neural network 204. The step S2204 and steps S2205 to S2207 are the same as the steps S604 to S607 in FIG. 6, and hence description thereof is omitted.

In a fifth embodiment, inter-channel gain correction is taken as an example of image processing, and a description will be given of an example of parameters of a learning model for which the learning process is performed using a teacher image and a training image subjected to inter-channel gain correction using correction values respectively associated with a plurality of processing operations of inter-channel gain correction.

The inter-channel gain correction is processing for correcting a gain of an output amplifier arranged at a final stage of analog output of a sensor. This output amplifier is an analog amplifier, and hence each amplifier has a gain difference. There is a difference in gain even between a plurality of output amplifiers arranged within the same sensor. Further, the gain has characteristics that it varies with the temperature. Therefore, if only one kind of network parameters are used, a noise difference caused by a gain difference between the output amplifiers, generated depending on a temperature condition, is not taken into account and hence a sufficient noise removal effect cannot be obtained. That is, optimum network parameters adapted to the characteristics of inter-channel gain correction are required for each temperature condition.

Figure 23:
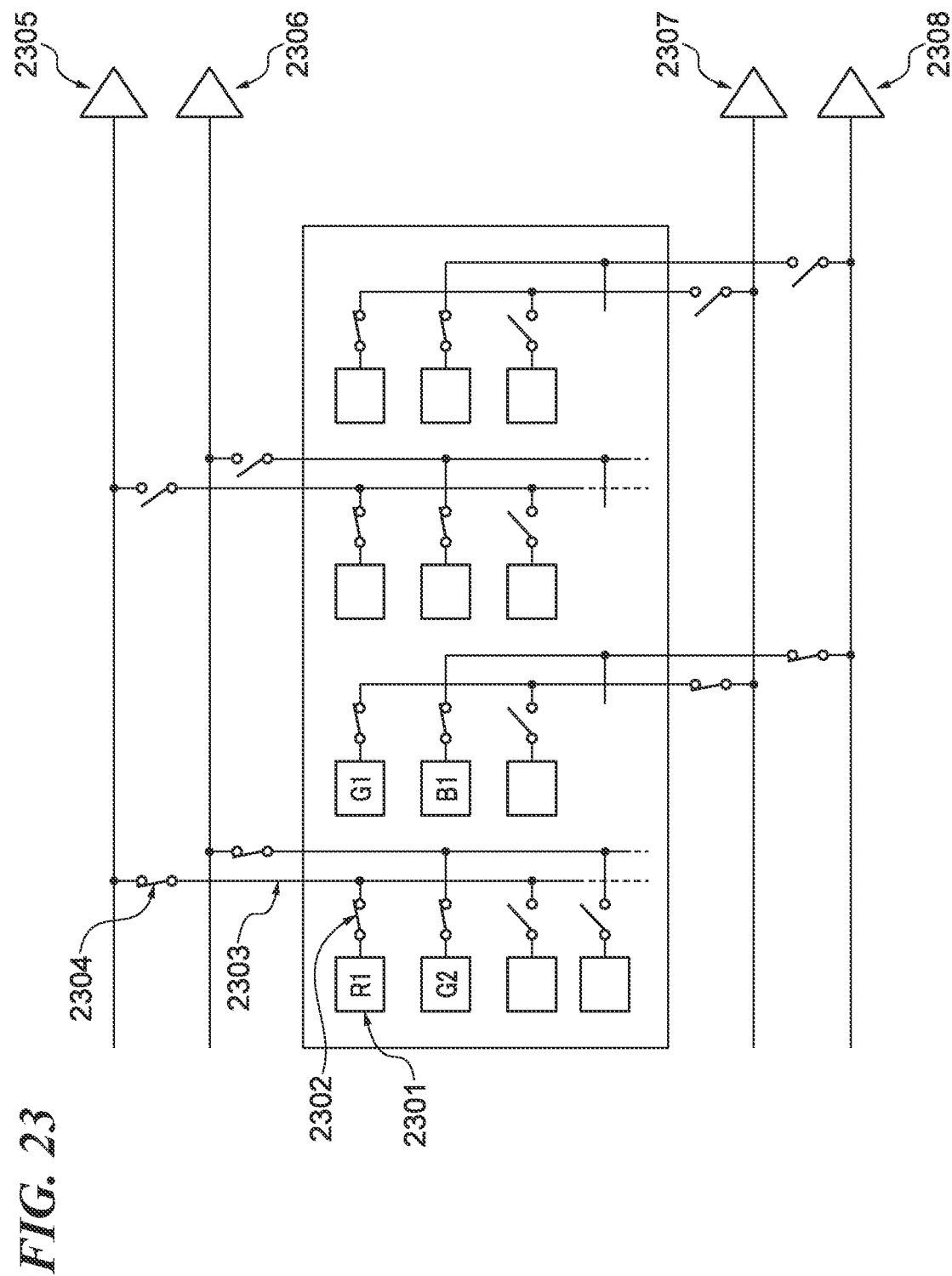
FIG. 23 is a diagram showing a sensor structure.

FIG. 23 is a diagram showing a sensor structure. Vertical lines 2303 are connected to photodiodes 2301 for converting the intensity of light to voltages via respective switches 2302. The vertical lines 2303 are connected to output amplifiers 2305 to 2308 via associated switches 2304, respectively. By switching on/off of these switches 2302 and 2304, voltage signals obtained from the associated photodiodes 2301 are read out from the output amplifiers 2305 to 2308. The inter-channel gain correction in the present embodiment is a function of correcting the gains of these four output amplifiers 2305 to 2308, and these output amplifiers 2305 to 2308 are referred to as the channels. For example, here, the output amplifier 2305 is referred to as the channel A, the output amplifier 2306 is referred to as the channel B, the output amplifier 2307 is referred to as the channel C, and the output amplifier 2308 is referred to as the channel D.

Figure 24A:
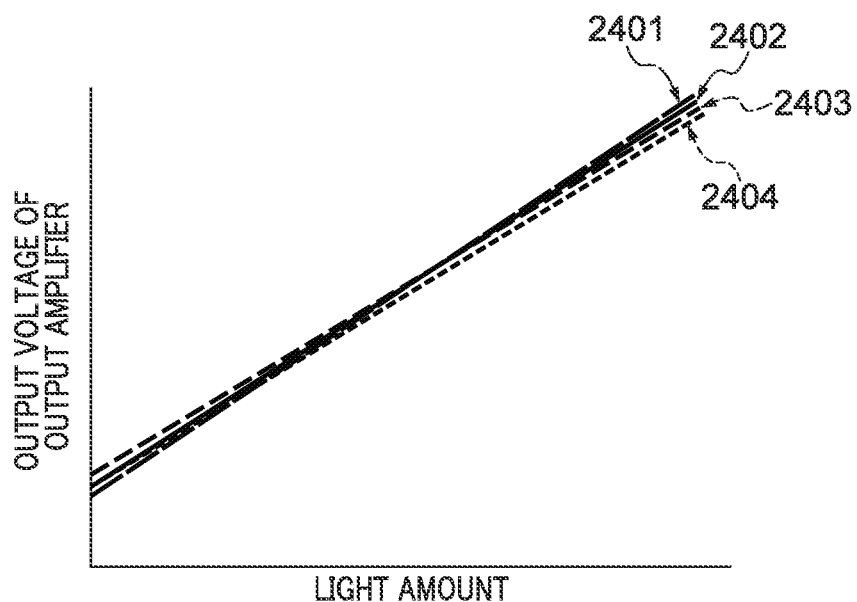
FIGS. 24A and 24B are diagram each showing output voltages of respective channels responsive to the amount of light entering photodiodes.
Figure 24B:
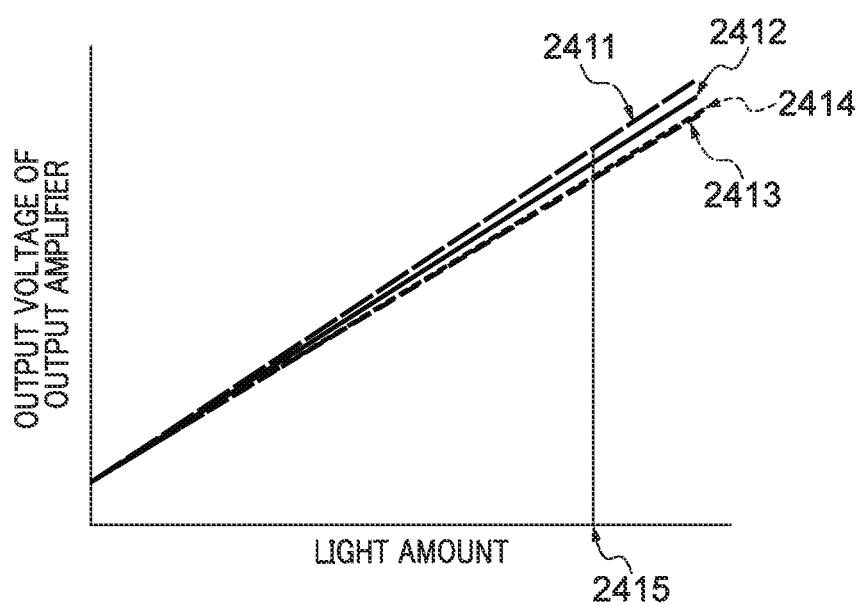

FIGS. 24A and 24B are diagram each showing output voltages of the respective channels with respect to an amount of light entering the photodiodes 2301.

Referring to FIG. 24A, a graph 2401 shows the output of the channel A, a graph 2402 shows the output of the channel B, a graph 2403 shows the output of the channel C, and a graph 2404 shows the output of the channel D. Since each output amplifier is an analog amplifier, as shown in FIG. 24A, differences occur in the output level. These differences in output level are ascribable to variation of the offset and variation of the gain between the channels, and the variation of the offset is first corrected, whereafter the variation of the gain is corrected. FIG. 24B is a diagram showing the output voltages of the respective channels in a state in which the variation of the offset has been corrected to make the black level in FIG. 24A uniform. Graphs 2411, 2412, 2413, and 2414 are graphs obtained by correcting the black levels of the graphs 2401, 2402, 2403, and 2404. In the inter-channel gain correction, a fixed amount of light indicated by a line 2415 is uniformly irradiated to the sensor to acquire an image, and averages of the output voltages of the channels are calculated from an area of 400 pixels×400 pixels in the center of the acquired image. The offset is subtracted from the average value of the output voltage of each channel, and a correction gain for each channel is calculated such that the subtraction result becomes a constant value. This calculation of the correction gain is performed with respect to cases where the sensor temperature is 60 degrees and 30 degrees. The correction gain thus acquired is stored in the ROM 106 as a correction value in association with a sensor number indicative of each individual sensor, a channer number (number assigned to each of the channels A to D), and temperature information.

Figure 25:
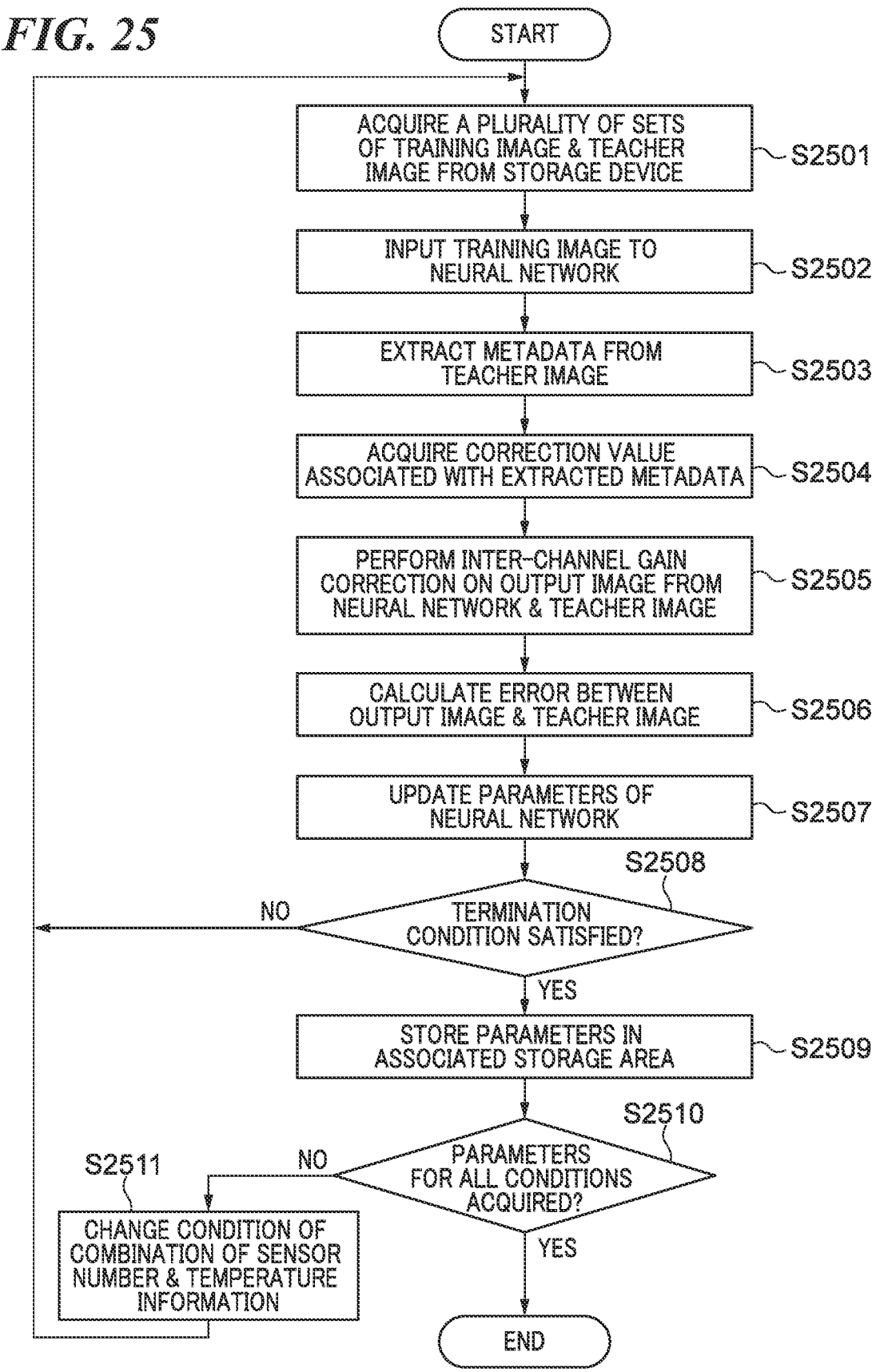
FIG. 25 is a flowchart of a flow of a learning process in a fifth embodiment.

Next, an example of the learning process in the fifth embodiment will be described. FIG. 25 is a flowchart of a flow of the learning process in the fifth embodiment. The process in FIG. 25 corresponds to the functional block diagram shown in FIG. 7A, and the correction section 704 of the image processor 205 performs the inter-channel gain correction. In a step S2501, the controller 209 acquires pairs of training images and teacher images (learning sets) from the storage device 201. In a step S2502, the controller 209 inputs a training image of one of the plurality of acquired learning sets to the neural network 204. An output image is generated by the process performed by the neural network 204. In a step S2503, the extraction section 702 of the image processor 205 extracts metadata from the teacher image. In a step S2504, the correction value-acquiring section 703 acquires a correction value (correction gain) associated with a combination of a sensor number and temperature information in the extracted metadata from the ROM 106. In a step S2505, the correction section 704 performs the inter-channel gain correction on the teacher image and the output image from the neural network 204 using the acquired correction value.

In a step S2506, the error evaluation section 206 calculates an error between the output image and the teacher image which have been subjected to image processing. In a step S2507, the parameter adjustment section 207 updates the parameters of the neural network 204 by back propagation such that the calculated error is reduced. In a step S2508, the controller 209 determines whether or not a predetermined termination condition is satisfied. If the answer to the question of the step S2508 is negative (NO), the predetermined termination condition is not satisfied, and hence the controller 209 returns to the step S2501. On the other hand, if the answer to the question of the step S2508 is affirmative (YES), the predetermined termination condition is satisfied, and hence the controller 209 proceeds to a step S2509.

In the step S2509, the controller 209 stores the updated parameters (learned parameters) in one of the parameter storage areas 208 which is associated with the applied correction condition of the sensor number and the temperature information. The correction condition of the inter-channel gain correction of the present embodiment is a correction value (correction gain) associated with a combination of a sensor number and temperature information. The controller 209 stores the updated parameters in the different parameter storage area 208 for each combination of a sensor number and temperature information. In a step S2510, the controller 209 determines whether or not the parameters have been acquired with respect to all conditions. The controller 209 performs the determination in the step S2510 based on whether or not all combinations of a sensor number and temperature information have been acquired. Note that if different sets of parameters are prepared for a plurality of image capturing apparatuses, respectively, it is only required to acquire e parameters associated with a sensor number associated with an image capturing apparatus in question. If the answer to the question of the step S2510 is affirmative (YES), the controller 209 terminates the process in FIG. 25. On the other hand, if the answer to the question of the step S2510 is negative (NO), the controller 209 proceeds to a step S2511. In the step S2511, the controller 209 changes the condition of the combination of a sensor number and temperature information. Then, the controller 209 returns to the step S2501. With this, the learning process is newly performed with respect to the changed combination of a sensor number and temperature information.

Figure 26:
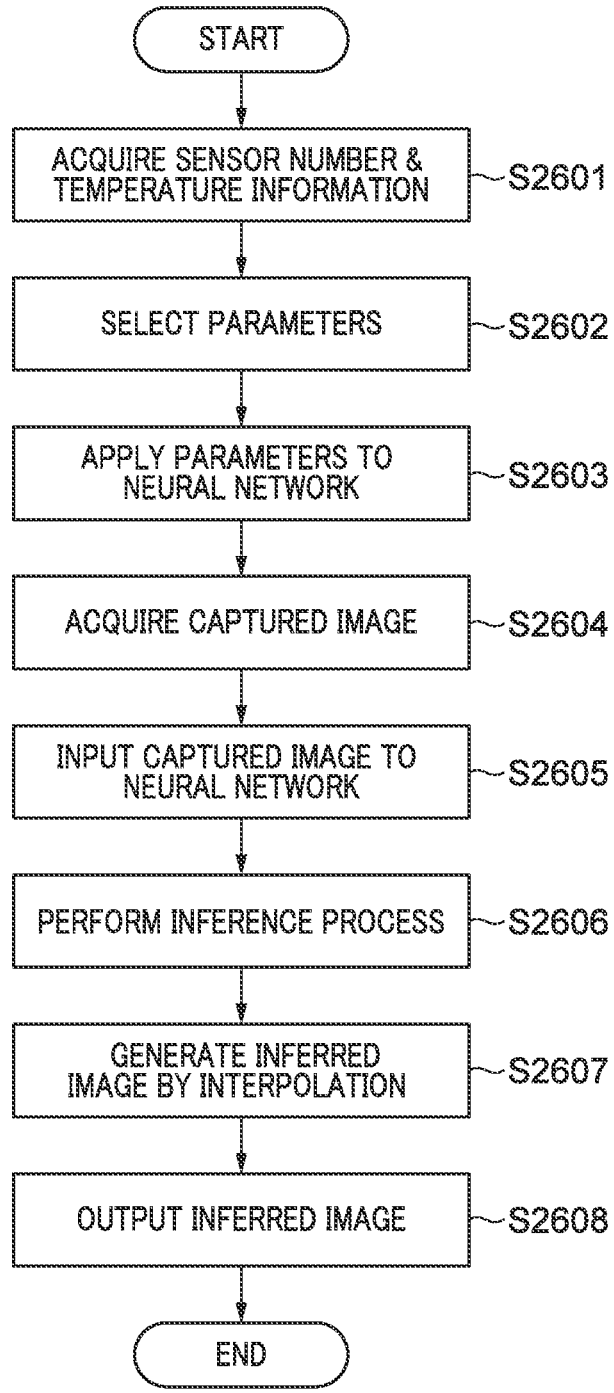
FIG. 26 is a flowchart of a flow of an inference process in the fifth embodiment.

Next, the inference process in the fifth embodiment will be described. FIG. 26 is a flowchart of a flow of the inference process in the fifth embodiment. In a step S2601, the acquisition section 501 acquires a sensor number and temperature information. The acquisition section 501 can acquire the sensor number and the temperature information from the image capturing apparatus 120. In a step S2602, the parameter selection section 502 selects parameters associated with the acquired sensor number from the parameter storage areas 208-1 to 208-n. In the present embodiment, since parameters are stored in association with 30 degrees and 60 degrees as temperature information, and hence both of parameters at 30 degrees and parameters at 60 degrees, which are associated with a sensor number, are selected. It is to be understood that not only parameters associated with 30 degrees and 60 degrees, but also parameters associated with a lot of temperatures may be prepared in advance, and parameters associated with a temperature closest to an acquired temperature may be used. In a step S2603, the controller 504 applies the selected parameters to the neural network 204. This makes it possible to perform the inference process using the neural network 204.

In a step S2604, the acquisition section 501 acquires a captured image. In a step S2605, the controller 504 inputs the acquired captured image to the neural network 204. In a step S2606, the neural network 204 performs the inference process. In the present embodiment, a first inferred image is generated by performing the inference process using the parameters associated with 30 degrees, and a second inferred image is generated by performing the inference process using the parameters associated with 60 degrees. In a step S2607, the inferred image output section 503 generates an inferred image according to the temperature information by interpolating the first inferred image and the second inferred image based on the acquired temperature information. More specifically, let it be assumed that t represents acquired temperature information, α represents a weighting addition coefficient, $Z_1$ represents a signal level at coordinates (x, y) in the first inferred image, and $Z_2$ represents a signal level at coordinates (x, y) in the second inferred image. In this case, a signal level $Z_{OUT}$(x, y) at coordinates (x, y) in an inferred image obtained by interpolating the first inferred image and the second inferred image can be calculated by the following equations (2) and (3):

$$\alpha=(-1/(60-30))\times t+2 \quad (2)$$

$$Z_{OUT}(x,y)=\alpha \times Z_1(x,y)+(1-\alpha)\times Z_2(x,y) \quad (3)$$

Note that when the temperature information indicates a temperature lower than 30 degrees, the temperature information may be regarded as a temperature of 30 degrees, and when the temperature information indicates a temperature higher than 60 degrees, the temperature information may be regarded as a temperature of 60 degrees. In a step S2608, the inferred image output section 503 outputs the inferred image generated in the step S2607 to the storage device 140. The inferred image output section 503 may output the generated inferred image to the ROM 106, the RAM 107, the display device 130, or the like.

As described above, in the first to fifth embodiments, the example of the parameters of the learning model is described by taking the ISO sensitivity correction, the F-number correction, the color suppression processing, the color curving correction, the color balance correction, the peripheral light falloff correction, and the inter-channel gain correction, as examples of image processing, but the image processing is not limited to these. For example, examples of image processing different from the image processing described above include flicker correction. The flicker correction is processing for correcting a difference in luminance value generated between lines of sensors, or between frames, due to flashing of a light source, such as a fluorescent light. It is possible to detect magnitude of flicker based on an amount of change (amplitude) of the luminance value which varies with the line and detect a frequency of flicker based on a period of variation of a luminance value on a line basis. The flicker has characteristics that how the flicker is generated is different depending on conditions, such as the brightness of a light source, the frequency of flashing, and sensor accumulation time. That is, the parameters of a learning model may be prepared for each of these conditions. In this case, it is also possible to obtain the advantageous effects as provided by the first to fifth embodiments.

In a sixth embodiment, compression processing and decompression processing are taken as an example of image processing, and a description will be given of an example of parameters of a learning model for which the learning process is performed using a teacher image and a training image subjected to compression processing and decompression processing at a plurality of compression rates, respectively. In the present embodiment, compression processing is performed on an image to be input to the neural network 204, and hence an advantageous effect that it is possible to reduce a circuit scale of the neural network, which is different from the effects provided by the first to fifth embodiments, can be obtained.

In the present embodiment, the image processor 205 performs compression processing for reducing the pixel value to 1/m and compression processing for reducing the pixel value to 1/n. Note that the compression processing method is not limited to this, but any other method may be employed insofar as it is the same method as the compression processing used in the inference process.

Figure 27:
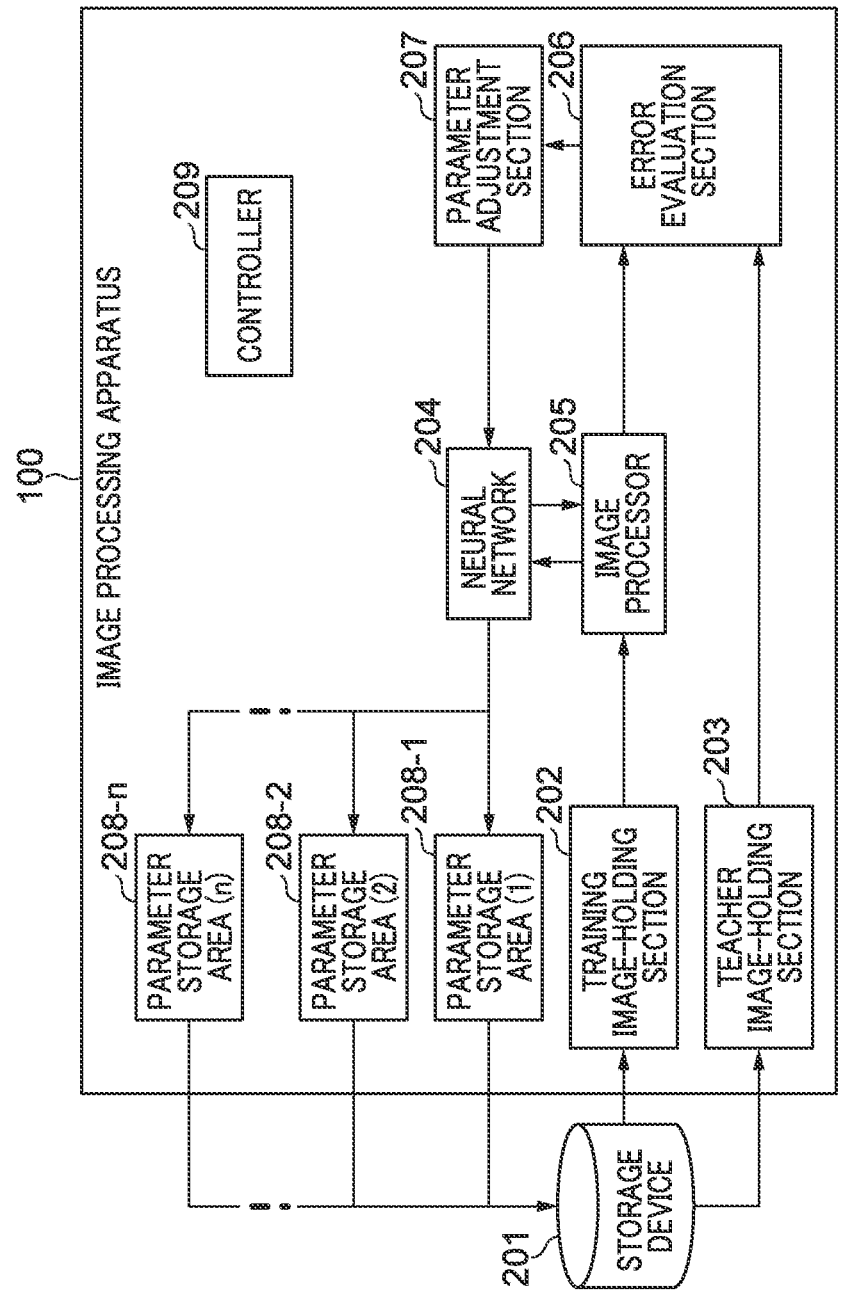
FIG. 27 is a functional block diagram of the image processing apparatus useful in explaining a learning process in a sixth embodiment.

FIG. 27 is a functional block diagram of the image processing apparatus 100 useful in explaining the learning process in the sixth embodiment. The sixth embodiment differs from the first embodiment in that the image processor 205 is arranged on the input side and the output side of the neural network 204. A training image is input to the image processor 205, and the image processor 205 performs the compression processing with respect to the training image at one of the plurality of compression rates. The image compressed by the image processor 205 is input to the neural network 204, and the neural network 204 generates and outputs an output image. Then, the output image is input to the image processor 205 again, and the image processor 205 performs the decompression processing associated with the compression rate in the compression processing on the output image. Then, the error evaluation section 206 calculates an error between the output image decompressed by the image processor 205 and the teacher image.

The learned parameters which have been compressed at different compression rates are stored in the parameter storage areas 208-1 and 208-2, respectively. Here, although the description is given assuming that the two types of compression rates are set, three or more types of compression rates may be set. In a case where n types of compression rates are set, the parameter storage areas 208-1 to 208-n are used.

Figure 28:
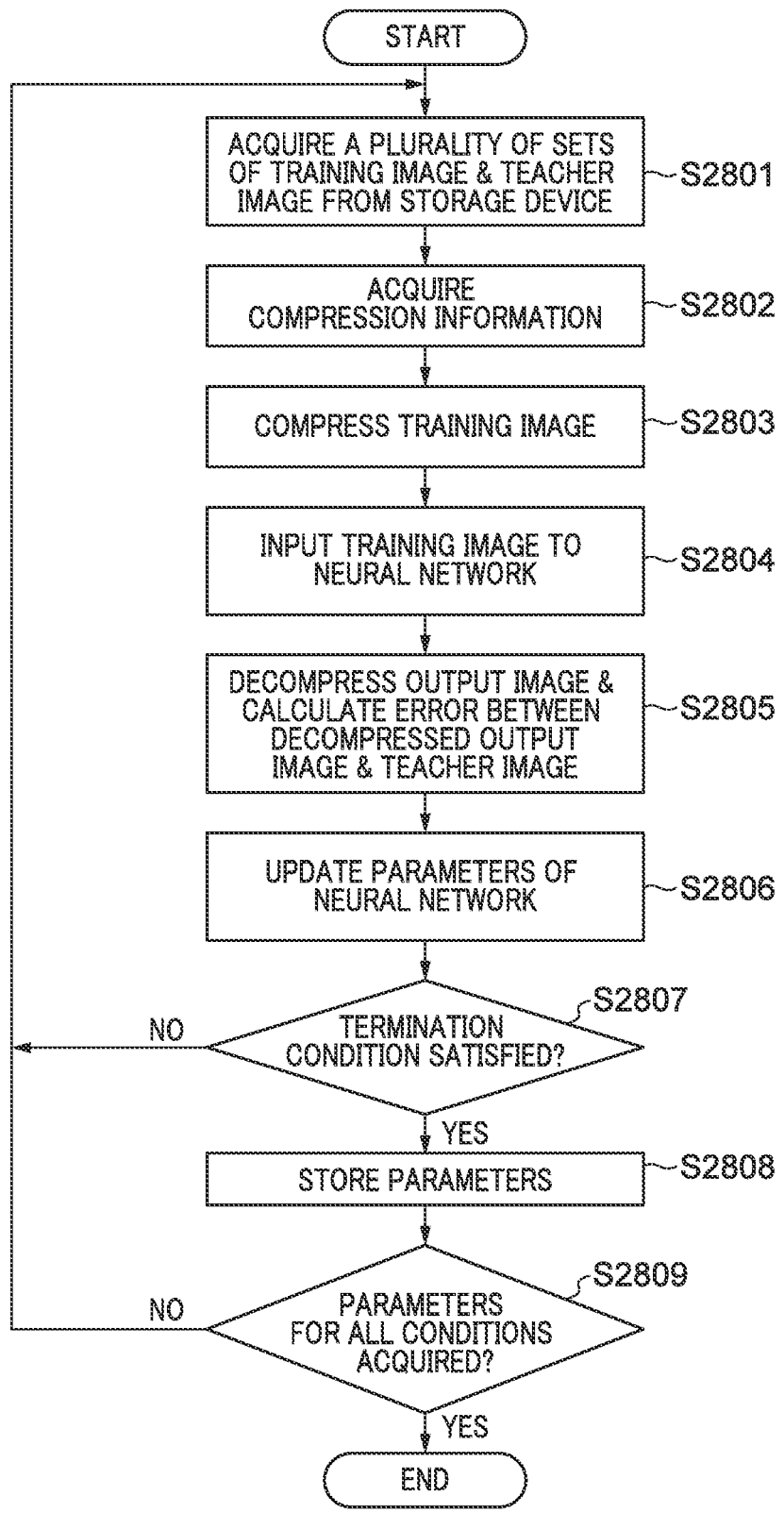
FIG. 28 is a flowchart of a flow of the learning process in the sixth embodiment.

Next, the learning process in the sixth embodiment will be described. FIG. 28 is a flowchart of a flow of the learning process in the sixth embodiment. In a step S2801, the controller 209 acquires pairs of training images and teacher images (learning sets) from the storage device 201. In a step S2802, the controller 209 acquires compression information. In the present embodiment, the compression information is information in which a value of 0 is set in a case where each pixel value of the training image is reduced to 1/m, and a value of 1 is set in a case where each pixel value of the training image is reduced to 1/n, and is formed by the same number of data items as the number of pixels of the training image. Note that the compression information is not limited to the information on the above-mentioned data format, but may be information on any other format insofar as it is information from which the method of compressing a training image is known. Further, the controller 209 may acquire, in the step S2802, the compression information which has been stored in one of the image capturing apparatus 120 and the storage device 140 in advance. Further, the image processor 205 may calculate the compression information directly from the training image in the next step S2803 without acquiring the compression information in the step S2802.

In the step S2803, the controller 209 controls the image processor 205 to compress the training image based on the compression information acquired in the step S2802. The image processor 205 performs the compression processing by reducing each pixel value to 1/m in a case where the compression information is set to 0 and reducing each pixel value to 1/n in a case where the compression information is set to 1. Note that the compression processing method is not limited to this, but any other method may be employed insofar as it is the same method as in the compression processing used in the process of the inference process. Further, the training image acquired in the step S2801 may be an image which has already been compressed. In this case, since the compression processing of the training image is not required, the process proceeds from the step S2801 directly to a step S2804, described hereinafter. Further, in a case where the image capturing apparatus 120 has a plurality of operation modes, and the compression processing method is different for each operation mode, the compression information acquired in the step S2802 may be changed and whether or not to perform the compression processing may be switched according to the operation mode.

In the step S2804, the controller 209 inputs the training image compressed in the step S2803 to the neural network 204 to generate an output image. Then, in a step S2805, the image processor 205 executes the decompression processing on the output image generated in the step S2804, and the error evaluation section 206 calculates an error between the decompressed output image and the teacher image.

In the present embodiment, in the step S2805, the image processor 205 performs the decompression processing which is reverse processing of the compression processing performed on the training image in the step S2803. More specifically, the image processor 205 performs the decompression processing by increasing each pixel value to m times in a case where the compression information is set to 0 and increasing each pixel value to n times in a case where the compression information is set to 1. However, the decompression processing method is not limited to the method of the present embodiment, but any other method may be employed insofar as it is the same method as in the decompression processing used in the inference process. Further, in a case where the image capturing apparatus 120 has a plurality of operation modes, and the methods of the compression processing and the decompression processing are different for respective operation modes, the methods of the compression processing and the decompression processing and whether or not to perform the compression processing and the decompression processing may be switched according to the operation mode. By using the same decompression method when expanding the inferred image and when expanding the output image in the step S2805, it is possible to perform the inference process with more stable accuracy without depending on the amount of noise generated after decompression processing is performed. In the next step S2806, the parameter adjustment section 207 updates the parameters of the neural network 204 by back propagation such that the calculated error is reduced. In a step S2807, the controller 209 determines whether or not a predetermined termination condition is satisfied. If the answer to the question of the step S2807 is negative (NO), the controller 209 returns to the step S2801. In this case, the steps S2801 to S2806 are executed using a new learning set of a training image and a teacher image. On the other hand, if the answer to the question of the step S2807 is affirmative (YES), the controller 20) proceeds to a step S2808.

In the step S2808, the controller 209 stores the updated parameters and information concerning the structure of the neural network, and so forth, in the parameter storage area 208-1 or 208-2. In a step S2809, the controller 209 determines whether or not the parameters have been acquired with respect to all items of compression information. If the answer to the question to the step S2809 is negative (NO), the controller 20) returns to the step S2801 and acquires another item of compression information in the step S2802. If the answer to the question to the step S2809 is affirmative (YES), the controller 209 terminates the process in FIG. 28. With the above-described operation, it is possible to obtain a neural network whose inference accuracy is hardly influenced with respect to a decompressed image without increasing the circuit scale.

Figure 29:
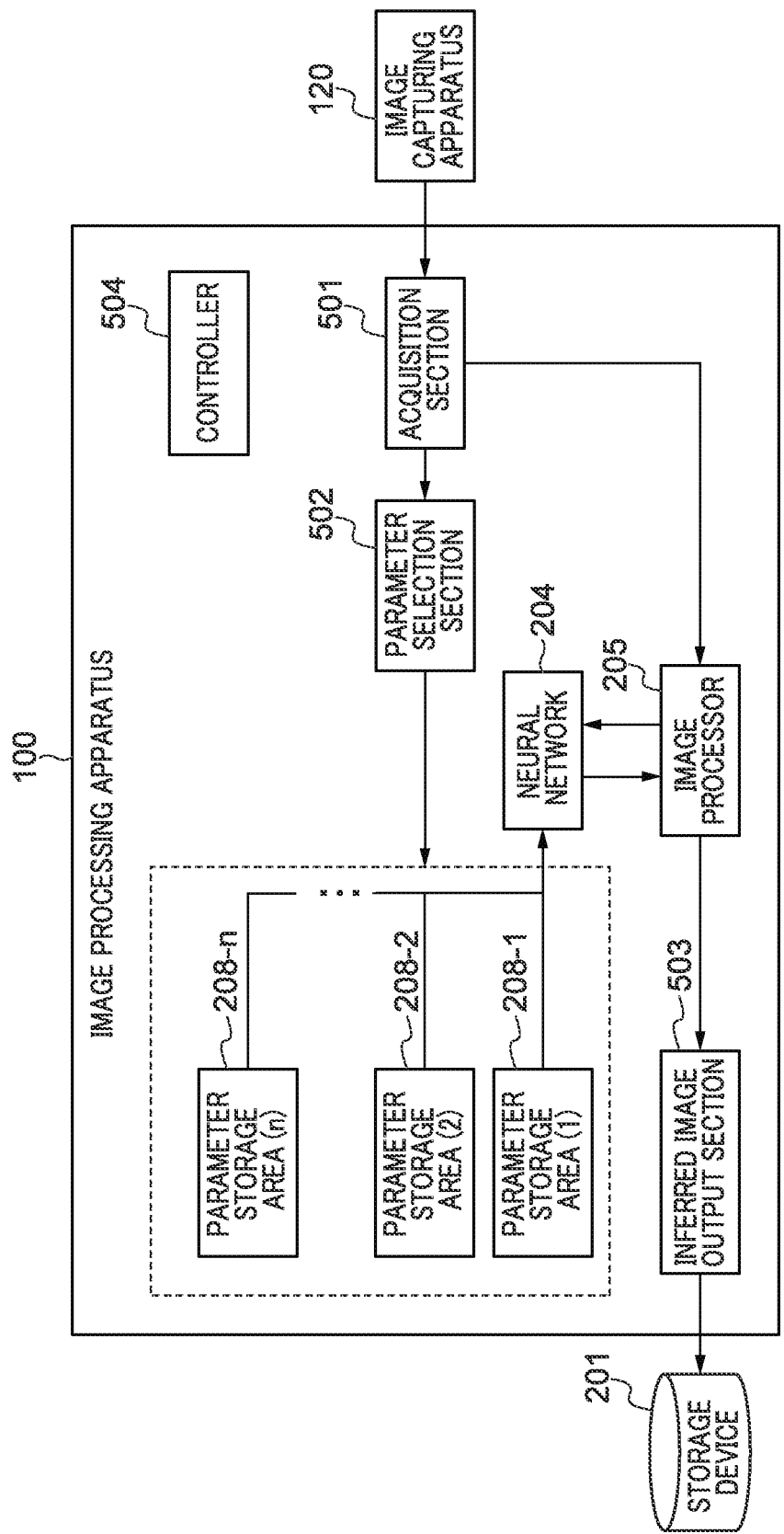
FIG. 29 is a functional block diagram of the image processing apparatus useful in explaining an inference process in the sixth embodiment.

FIG. 29 is a functional block diagram of the image processing apparatus 100 useful in explaining the inference process. The block diagram shown in FIG. 29 differs from the block diagram shown in FIG. 5 in that the image processor 205 is arranged between the acquisition section 501 and the neural network 204, and between the neural network 204 and the inferred image output section 503. This image processor 205 performs processing for compressing and decompressing an image.

FIG. 30 is a flowchart of a flow of the inference process in the sixth embodiment. In a step S3001, the acquisition section 501 acquires compression information. The acquisition section 501 can acquire the compression information from the image capturing apparatus 120. For example, the acquisition section 501 can acquire the compression information based on the settings of the image capturing apparatus 120. This compression information has the same format as that of the compression processing used in the learning process. More specifically, in the present embodiment, the compression information is information in which the value of 0 is set in a case where each pixel value of a captured image is reduced to 1/m, and the value of 1 is set in a case where each pixel value of a captured image is reduced to 1/n. Note that the compression information is not limited to this format, but may be information on any other data format insofar as it is the same format as that in the compression processing used in the learning process. In a step S3002, the parameter selection section 502 selects parameters associated with the acquired compression information from the parameter storage areas 208-1 or 208-2. Then, in a step S3003, the controller 504 applies the selected parameters to the neural network 204. This makes it possible to perform the inference process using the neural network 204.

In a step S3004, the acquisition section 501 acquires a captured image from the image capturing apparatus 120. Note that this captured image is an uncompressed RAW image and is formed by the same number of data items as the number of pixels of the training image. The acquisition section 501 may acquire a RAW image from the storage device 140. In a step S3005, the image processor 205 performs compression processing corresponding to the compression information acquired in the step S3001 on the acquired captured image. The image processor 205 performs the compression processing by reducing each pixel value to 1/m in a case where the compression information is set to 0 and reducing each pixel value to 1/n in a case where the compression information is set to 1. Note that the compression processing method is not limited to this, but any other method may be employed insofar as it is possible to reduce the amount of data of the captured image. Further, the captured image acquired in the step S3004 may be an image which has already been compressed. In this case, the processing for compressing the captured image is not required, and hence the process proceeds from the step S3004 to a step S3006. Further, in a case where the image capturing apparatus 120 has a plurality of operation modes, and the compression processing method is different for each operation mode, the compression information acquired in the step S3001 may be changed and whether or not to perform the compression processing may be switched according to the operation mode.

In the step S3006, the controller 504 inputs the compressed captured image to the neural network 204. In a step S3007, the neural network 204 performs the inference process and generates an inferred image. In a step S3008, the image processor 205 performs the decompression processing with respect to the inferred image generated in the step S3007. In the present embodiment, the image processor 205 performs the decompression processing which is reverse processing of the compression processing performed on the captured image in the step S3005. More specifically, the image processor 205 performs the decompression processing for increasing each pixel value to m times in a case where the compression information is set to 0 and increasing each pixel value to n times in a case where the compression information is set to 1. However, the decompression processing method is not limited to the method of the present embodiment, but any other method may be employed insofar as it is the same method as in the decompression processing used in the process of the learning process. Further, in a case where the decompression processing is to be separately performed in a downstream stage, the inferred image is not required to be decompressed here. In a step S3009, the inferred image output section 503 outputs the decompressed inferred image to the storage device 140. The inferred image output section 503 may output the generated inferred image to the ROM 106, the RAM 107, the display device 130, or the like.

According to the present embodiment, an image to be input to the neural network 204 is compressed, and hence it is possible to reduce the circuit scale of the neural network. Further, after an output image from the neural network 204 is decompressed, the network parameters are updated in the learning process, and hence it is possible to suppress lowering of noise suppression effect of the neural network for inference, caused by the above-described compression processing.

Although the description is given of the first to sixth embodiments, parameters of the neural network, associated with a combination of correction conditions in the respective embodiments, may be used. That is, parameters may be used which are associated with a combination of two or more correction conditions out of the ISO sensitivity correction, the F-number correction, the color suppression processing, the color curving correction, the color balance correction, the peripheral light falloff correction, the inter-channel gain correction, the flicker correction, and the compression/decompression processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
at least one processor; and
a memory coupled to the at least one processor, the memory having instructions that, when executed by the processor, perform the operations as:
an image processing unit configured to perform image processing on a training image and a teacher image according to each of a plurality of correction conditions;
a learning unit configured to perform machine learning of a learning model using the training image and the teacher image; and
a control unit configured to perform control for storing a plurality of parameters obtained by performing the machine learning of the learning model, in association with the plurality of correction conditions, respectively,
wherein the image processing is at least one of sensitivity correction for correcting an analog gain according to a combination of a column amplifier and a ramp circuit, correction of multiplying an image by a gain according to an aperture value of a lens, such that a relationship between the aperture value and a light amount is made closer to linearity, color suppression processing for correcting chroma, color curving correction for correcting changes in color, color balance correction, peripheral light falloff correction, correction based on a gain difference between channels of a sensor, flicker correction, and compression processing.

2. The image processing apparatus according to claim 1, wherein the at least one processor is configured to further perform the operations as:
a selection unit configured to select a parameter from the plurality of stored parameters, according to information on any of the plurality of correction conditions, and
an inference unit configured to perform an inference process on an image by applying the selected parameter to the learning model.

3. The image processing apparatus according to claim 1, wherein the training image on which the image processing is performed has been subjected to processing by the learning model.

4. The image processing apparatus according to claim 1, wherein the training image is an image generated by adding noise to the teacher image.

5. The image processing apparatus according to claim 1, wherein the image processing is a combination of at least two or more of sensitivity correction for correcting an analog gain according to a combination of a column amplifier and a ramp circuit, correction of multiplying an image by a gain according to an aperture value of a lens, such that a relationship between the aperture value and a light amount is made closer to linearity, color suppression processing for correcting chroma, color curving correction for correcting changes in color, color balance correction, peripheral light falloff correction, correction based on a gain difference between channels of a sensor, flicker correction, and compression processing.

6. The image processing apparatus according to claim 1, wherein the image processing is ISO sensitivity correction for correcting an analog gain according to a combination of a column amplifier and a ramp circuit.

7. The image processing apparatus according to claim 6, wherein the plurality of correction conditions are ISO sensitivities, and
wherein the control unit stores the plurality of parameters in association with the ISO sensitivities, respectively.

8. The image processing apparatus according to claim 6, wherein plurality of correction conditions are combinations each of an ISO sensitivity and a temperature, and
wherein the control unit stores the plurality of parameters in association with the combinations each of an ISO sensitivity and a temperature, respectively.

9. The image processing apparatus according to claim 1, wherein the image processing is correction of multiplying an image by a gain according to an aperture value of a lens, such that a relationship between the aperture value and a light amount is made closer to linearity.

10. The image processing apparatus according to claim 9, wherein the plurality of correction conditions are aperture values, and
wherein the control unit stores the plurality of parameters in association with the aperture values, respectively.

11. The image processing apparatus according to claim 9, wherein the control unit makes a granularity of stored parameters different between a section in which the aperture value and the gain has a linear relationship and a section in which the aperture value and the gain has a non-linear relationship.

12. The image processing apparatus according to claim 1, wherein the image processing is at least one of color suppression processing for correcting chroma and color curving correction for correcting changes in color.

13. The image processing apparatus according to claim 12, wherein the plurality of correction conditions are each at least one of a gamma value and a color gamut, and
wherein the control unit stores the plurality of parameters each in association with at least one of a gamma value and a color gamut.

14. The image processing apparatus according to claim 1, wherein the image processing is peripheral light falloff correction.

15. The image processing apparatus according to claim 14, wherein the plurality of correction conditions are each at least one of a lens type, an aperture value, a zoom position, and a focal length, and
wherein the control unit stores the plurality of parameters each in association with at least one of a lens type, an aperture value, a zoom position, and a focal length.

16. The image processing apparatus according to claim 1, wherein the image processing is correction based on a gain difference between channels of a sensor.

17. The image processing apparatus according to claim 16, wherein the plurality of correction conditions are combinations each of an individual sensor and a temperature, and
wherein the control unit stores the plurality of parameters in association with the combinations each of an individual sensor and a temperature, respectively.

18. The image processing apparatus according to claim 1, wherein the image processing is flicker correction.

19. The image processing apparatus according to claim 18, wherein the plurality of correction conditions are each at least one of a brightness of a light source, a frequency of flashing of the light source, and a sensor accumulation time, and
wherein the control unit stores the plurality of parameters each in association with at least one of a brightness of a light source, a frequency of flashing of the light source, and a sensor accumulation time.

20. The image processing apparatus according to claim 1, wherein the image processing is compression processing.

21. The image processing apparatus according to claim 20, wherein the plurality of correction conditions of the image processing are compression rates, and
wherein the control unit stores the plurality of parameters in association with the compression rates, respectively.

22. The image processing apparatus according to claim 21, wherein the at least one processor is configured to further perform the operations as:
a selection unit configured to select a parameter from a plurality of stored parameters according to any one of the compression rates, and
an inference unit configured to perform an inference process on an image which has been compressed by the compression rate by applying the selected parameter to the learning model.

23. The image processing apparatus according to claim 20, wherein the image processing is compression processing and decompression processing, and
wherein the learning unit includes:
a first acquisition unit configured to acquire the training image and the teacher image,
a first generation unit configured to input the training image on which the compression processing has been performed by the image processing unit to the learning model to generate an output image,
a calculation unit configured to calculate an error between the output image on which the decompression processing has been performed by the image processing unit, and the teacher image, and
a first update unit configured to update the plurality of parameters based on the calculated error.

24. The image processing apparatus according to claim 23, wherein the at least one processor is configured to further perform the operations as:
an inference unit,
the inference unit including:
a second acquisition unit configured to acquire a captured image,
a second update unit configured to update the parameters of the learning model to the updated parameters, and
a second generation unit configured to input the captured image on which the compression processing has been performed by the image processing unit, to the learning model of which the parameters have been updated, to generate an inferred image.

25. A method of controlling an image processing apparatus, comprising:
performing image processing on a training image and a teacher image according to each of a plurality of correction conditions;
performing machine learning of a learning model using the training image and the teacher image; and
storing a plurality of parameters obtained by performing the machine learning of the learning model, in association with the plurality of correction conditions, respectively,
wherein the image processing is at least one of sensitivity correction for correcting an analog gain according to a combination of a column amplifier and a ramp circuit, correction of multiplying an image by a gain according to an aperture value of a lens, such that a relationship between the aperture value and a light amount is made closer to linearity, color suppression processing for correcting chroma, color curving correction for correcting changes in color, color balance correction, peripheral light falloff correction, correction based on a gain difference between channels of a sensor, flicker correction, and compression processing.

26. A non-transitory computer-readable storage medium storing a program for causing a computer to execute a method of controlling an image processing apparatus, the method comprising:
performing image processing on a training image and a teacher image according to each of a plurality of correction conditions;
performing machine learning of a learning model using the training image and the teacher image; and
storing a plurality of parameters obtained by performing the machine learning of the learning model, in association with the plurality of correction conditions, respectively,
wherein the image processing is at least one of sensitivity correction for correcting an analog gain according to a combination of a column amplifier and a ramp circuit, correction of multiplying an image by a gain according to an aperture value of a lens, such that a relationship between the aperture value and a light amount is made closer to linearity, color suppression processing for correcting chroma, color curving correction for correcting changes in color, color balance correction, peripheral light falloff correction, correction based on a gain difference between channels of a sensor, flicker correction, and compression processing.

* * * * *